United States Patent
Di Pasquale et al.

(10) Patent No.: US 6,437,906 B1
(45) Date of Patent: Aug. 20, 2002

(54) ALL-OPTICAL GAIN CONTROLLED L-BAND EDFA STRUCTURE WITH REDUCED FOUR-WAVE MIXING CROSS-TALK

(75) Inventors: Fabrizio Di Pasquale; Giovanni Sacchi, both of Milan; Alberto Zermani, Piancenza; Silvia Turolla, Milan, all of (IT)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/717,005

(22) Filed: Nov. 22, 2000

(51) Int. Cl.[7] .................................................. H01S 3/00
(52) U.S. Cl. ................... 359/337.2; 359/341.1
(58) Field of Search .............. 359/337, 337.2, 359/337.4, 341.1, 341.33

(56) References Cited

U.S. PATENT DOCUMENTS

| | | | | |
|---|---|---|---|---|
| 5,050,949 A | * | 9/1991 | DiGiovanni et al. | 359/341 |
| 5,526,163 A | | 6/1996 | Suyama | 359/179 |
| 5,677,786 A | | 10/1997 | Meli | 359/341 |
| RE35,697 E | | 12/1997 | Grasso et al. | 385/24 |
| 5,748,364 A | | 5/1998 | Meli et al. | 359/341 |
| 5,852,510 A | | 12/1998 | Meli et al. | 359/341 |
| 6,025,954 A | | 2/2000 | Meli et al. | 359/341 |
| 6,031,646 A | * | 2/2000 | Sniadower | 359/160 |
| 6,172,803 B1 | * | 1/2001 | Masuda et al. | 359/341 |
| 6,259,555 B1 | | 7/2001 | Meli et al. | 359/337 |

* cited by examiner

Primary Examiner—Mark Hellner
(74) Attorney, Agent, or Firm—Ritter, Lang & Kaplan LLP

(57) ABSTRACT

An approach for minimizing four-wave mixing (FWM) cross-talk (XT) in a WDM (wavelength division multiplexing) optical communication system is disclosed. An Erbium doped Fiber Amplifier (EDFA) includes a pre-amplifier that receives an input optical signal and outputs an amplified input optical signal. The pre-amplifier includes the following components: a first active fiber that carries WDM signals corresponding to a particular operating band (e.g., L-band); a co-propagating pump laser that induces high inversion in a portion of the first active fiber; a filter that is coupled to the first active fiber and slightly inverts the gain tilt of the WDM signals and suppresses the amplified spontaneous emission (ASE) lights accumulated at wavelengths shorter than the signal bandwidth; a second active fiber that is coupled to the filter; and a counter-propagating pump laser that induces high inversion in a portion of the second active fiber. An optical unit (e.g., an optical add/drop module, a gain equalizing filter (GEF), or a dispersion compensating fiber (DCF)) may be coupled to the pre-amplifier and receives the amplified input signal, in which the optical unit introduces a prescribed loss to the WDM system. A booster amplifier is coupled to the optical unit and is configured to amplify a signal that is output from the optical unit. An automatic optical gain control (AOGC) mechanism of the EDFA provides nearly constant gain that is independent of the number of channels utilized in the WDM system and also minimizes system penalties due to fast relaxation oscillations induced by adding/dropping of channels.

51 Claims, 31 Drawing Sheets

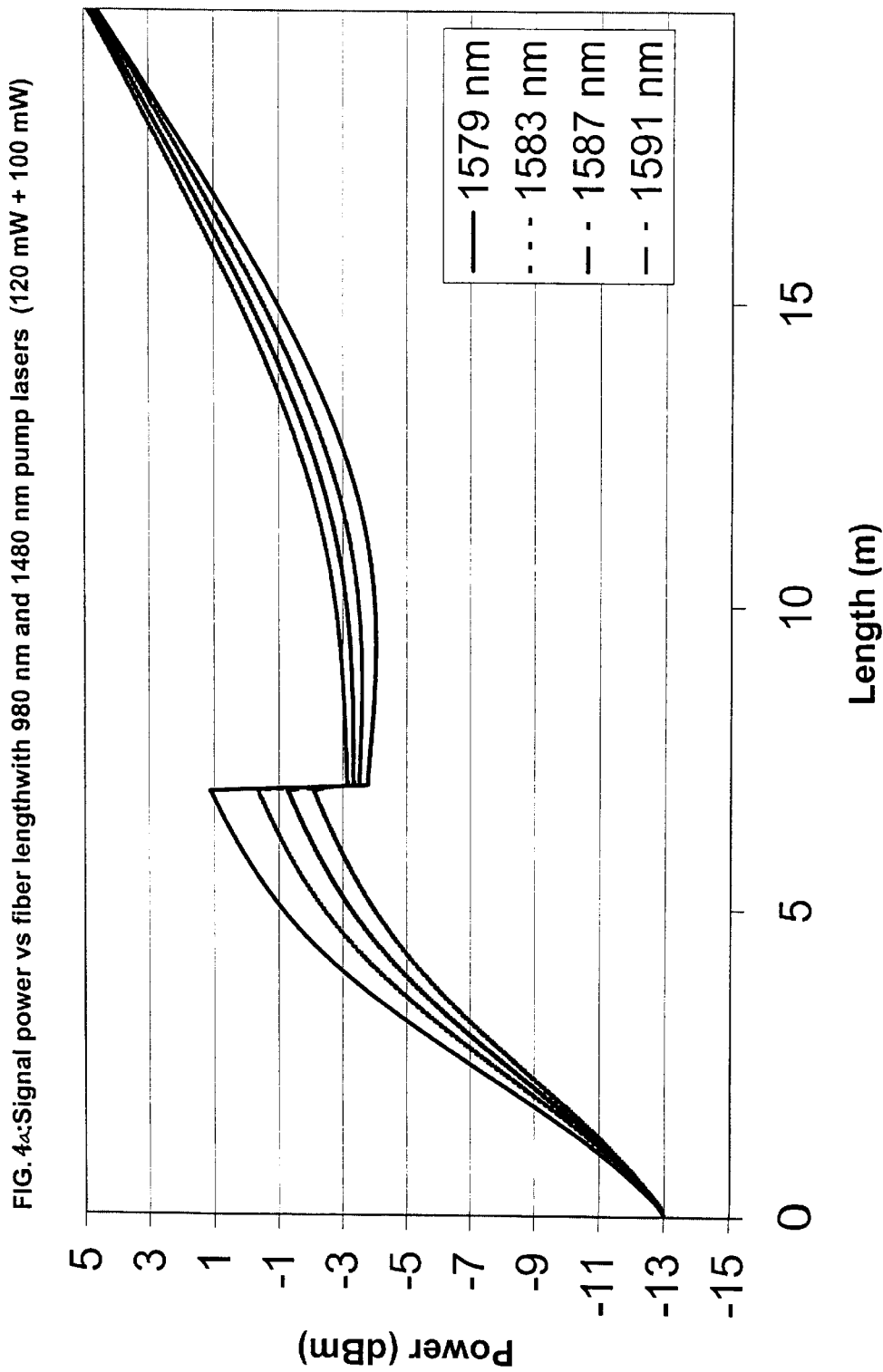

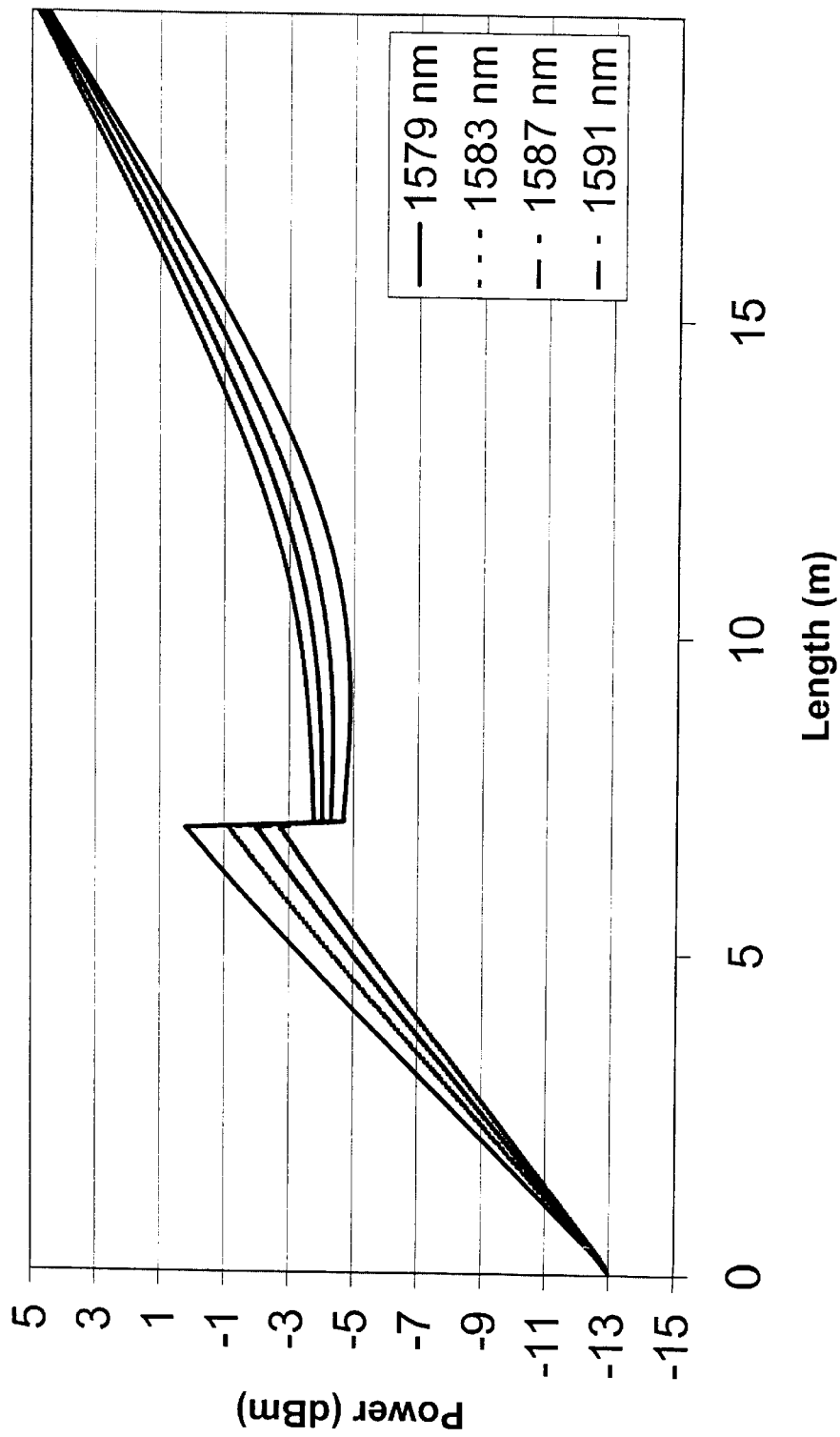
FIG. 4b: Signal power vs fiber length with two 1480 nm pump lasers (120 mW + 100 mW)

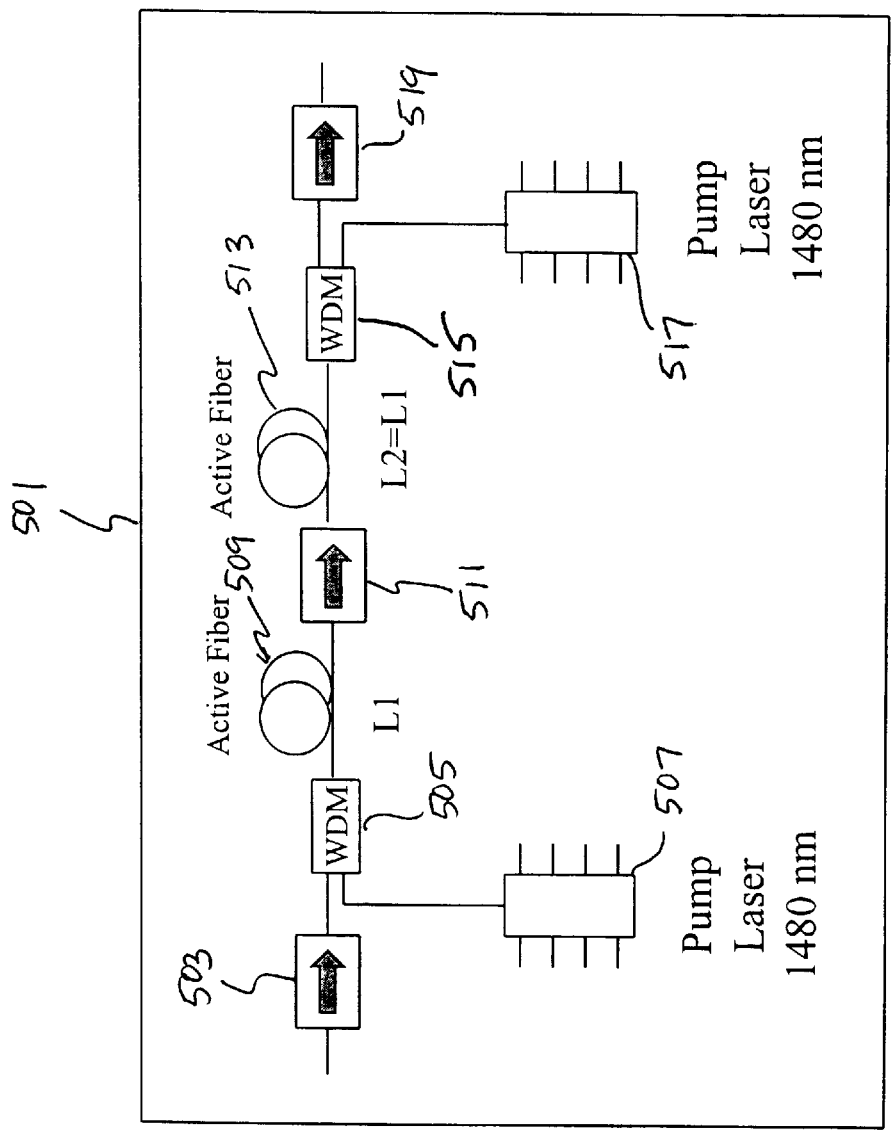
Fig. 5: Traditional pre-amplifier structure

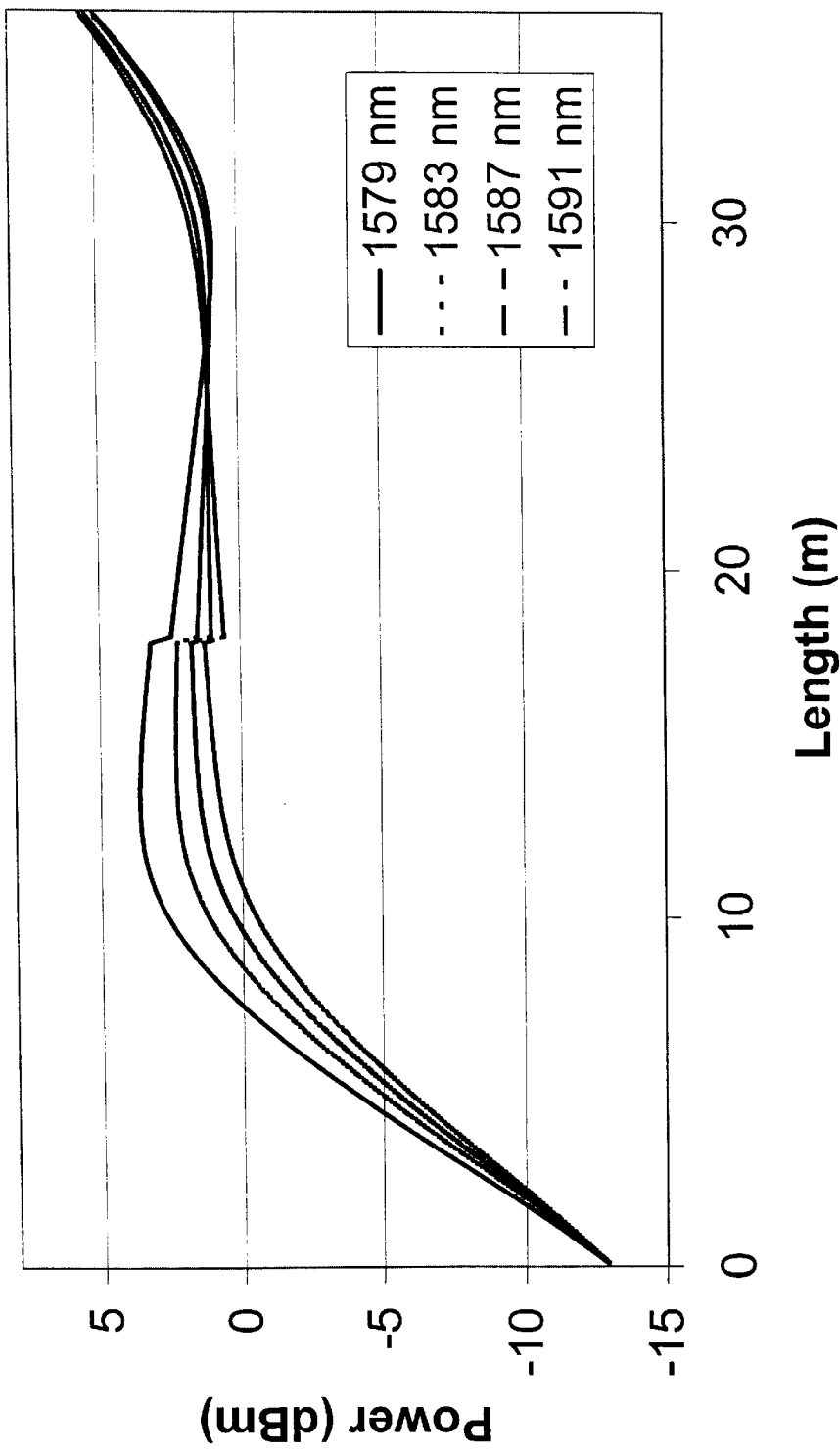

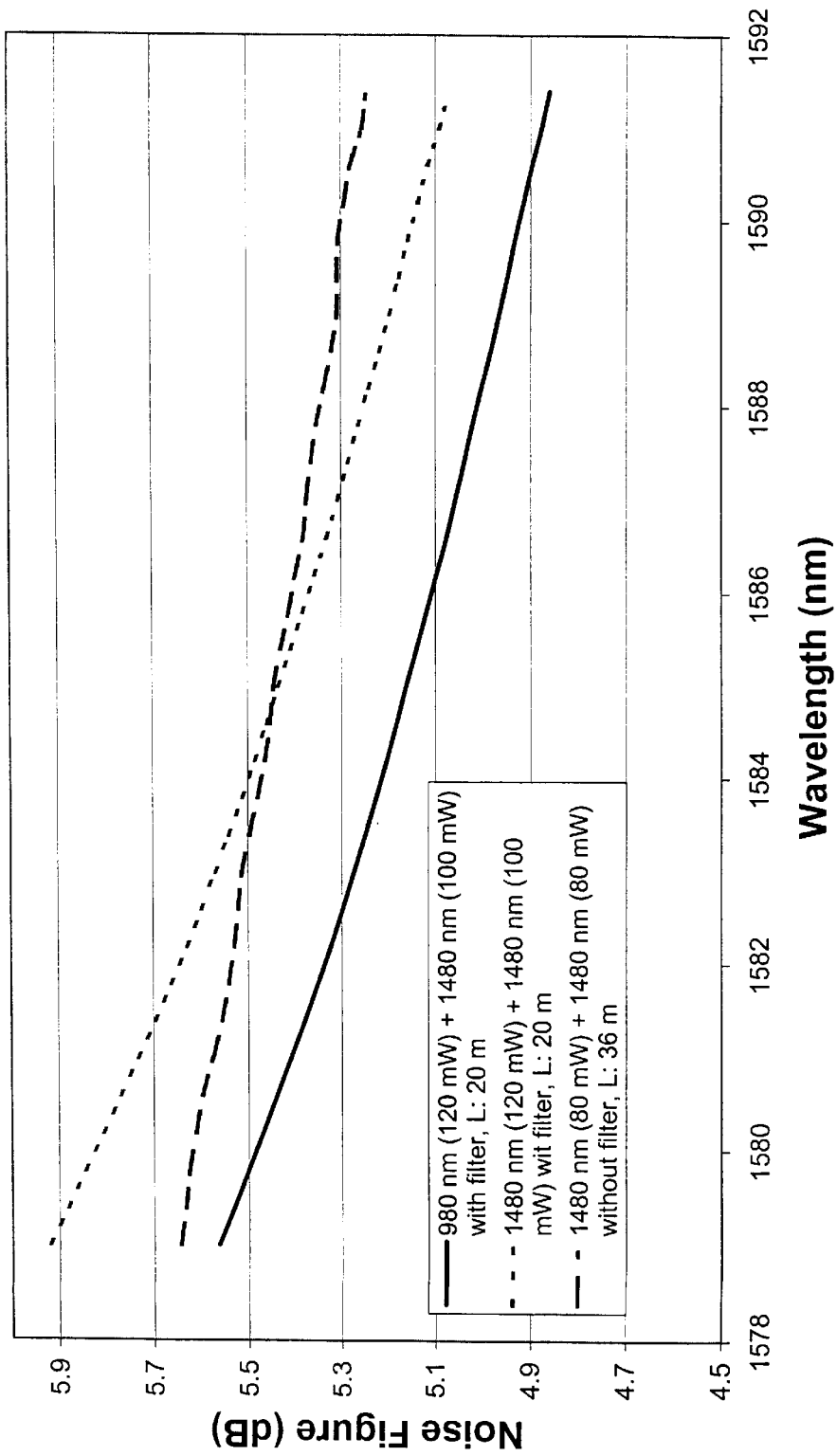

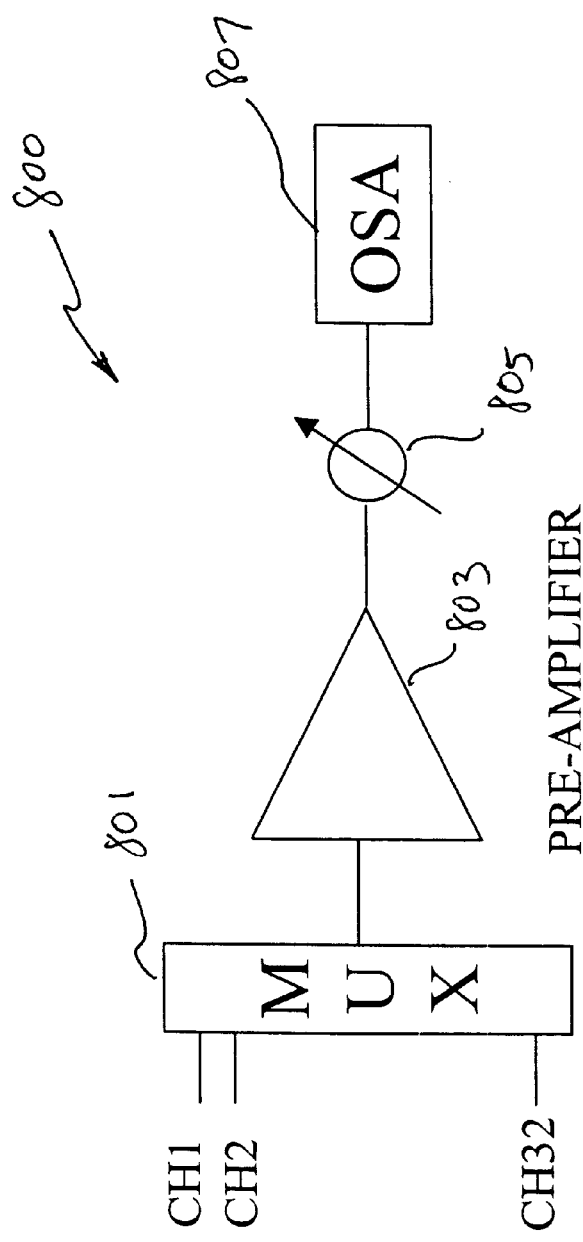
Fig. 8: Experimental set-up for FWM XT measurement (polarization maintaining MUX and laser sources)

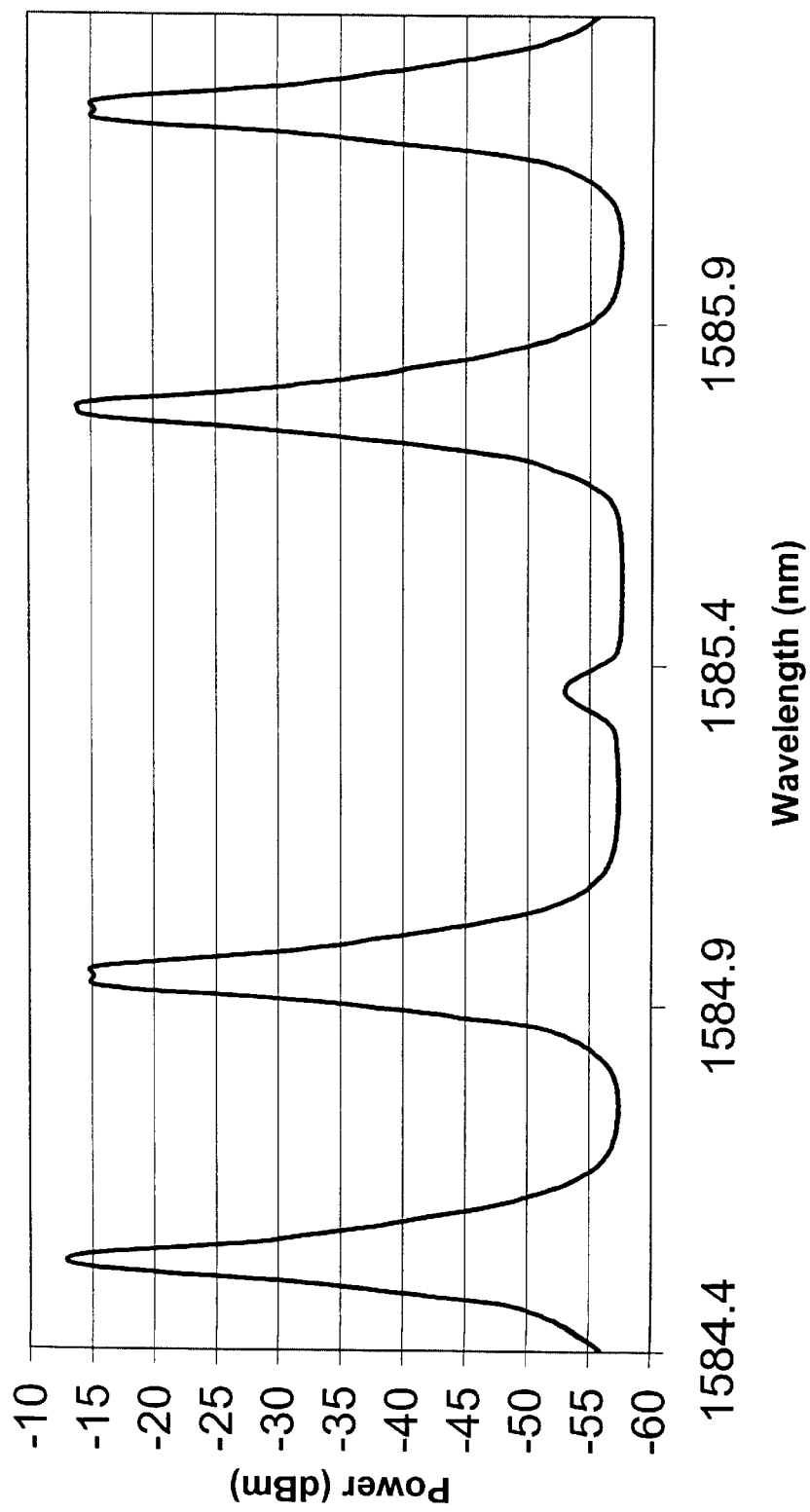
Fig. 9: Measured FWM product under the middle channel (32 WDM Channels, 50 GHz spacing)

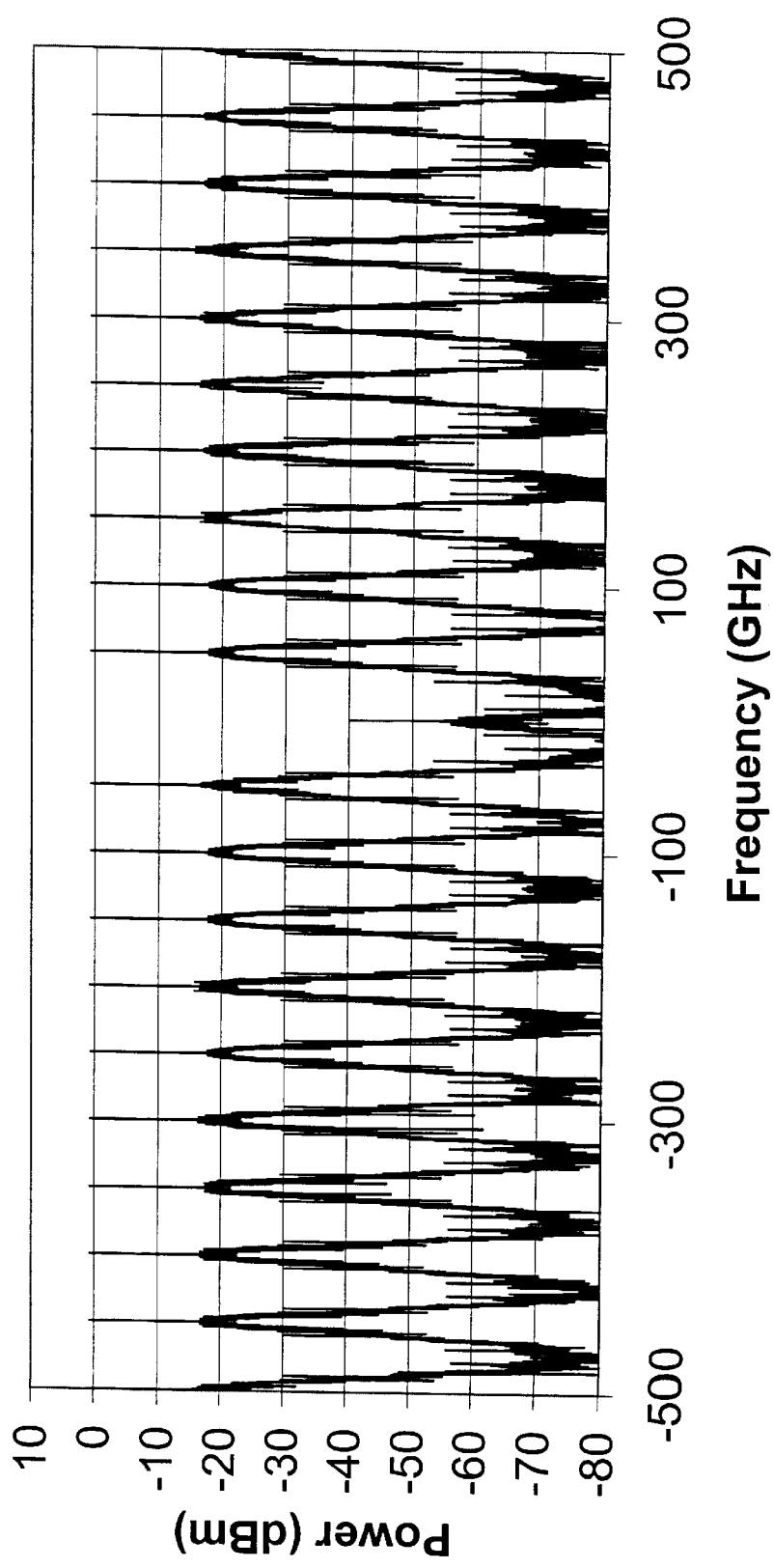
Fig. 10: Computed output spectrum with 32 chs at 10 Gb/s FWM XT for middle channel: -39 dB

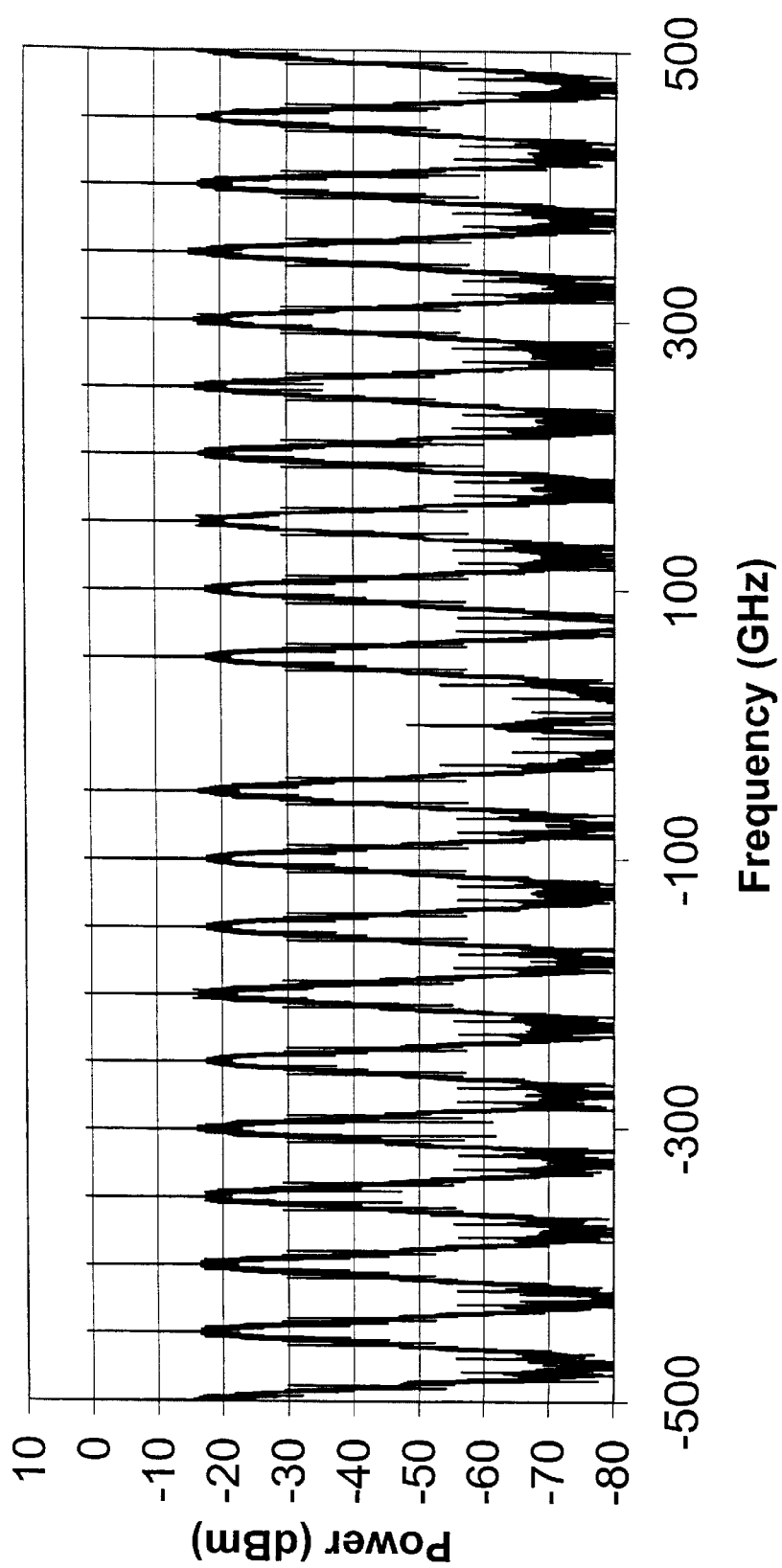

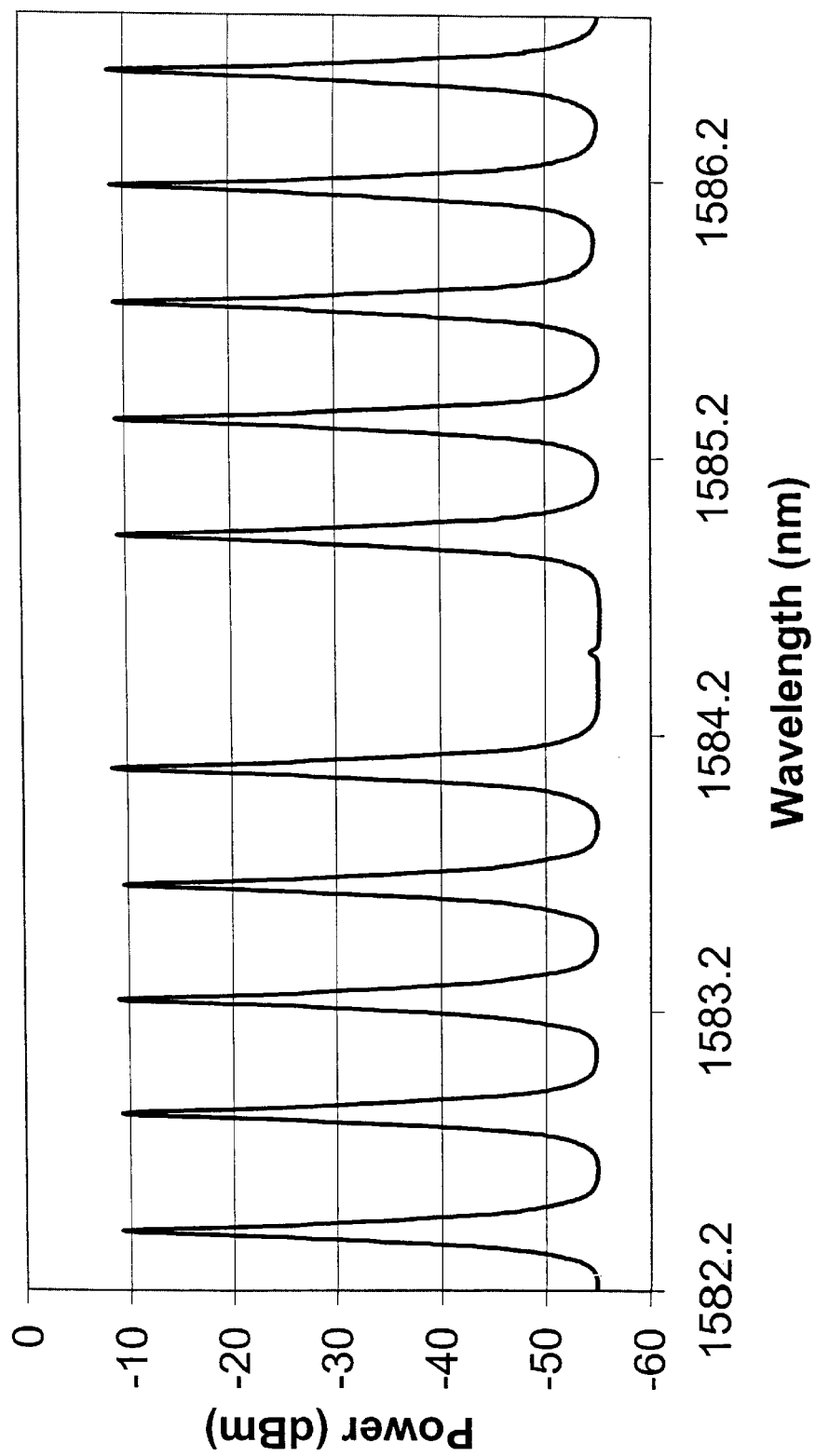

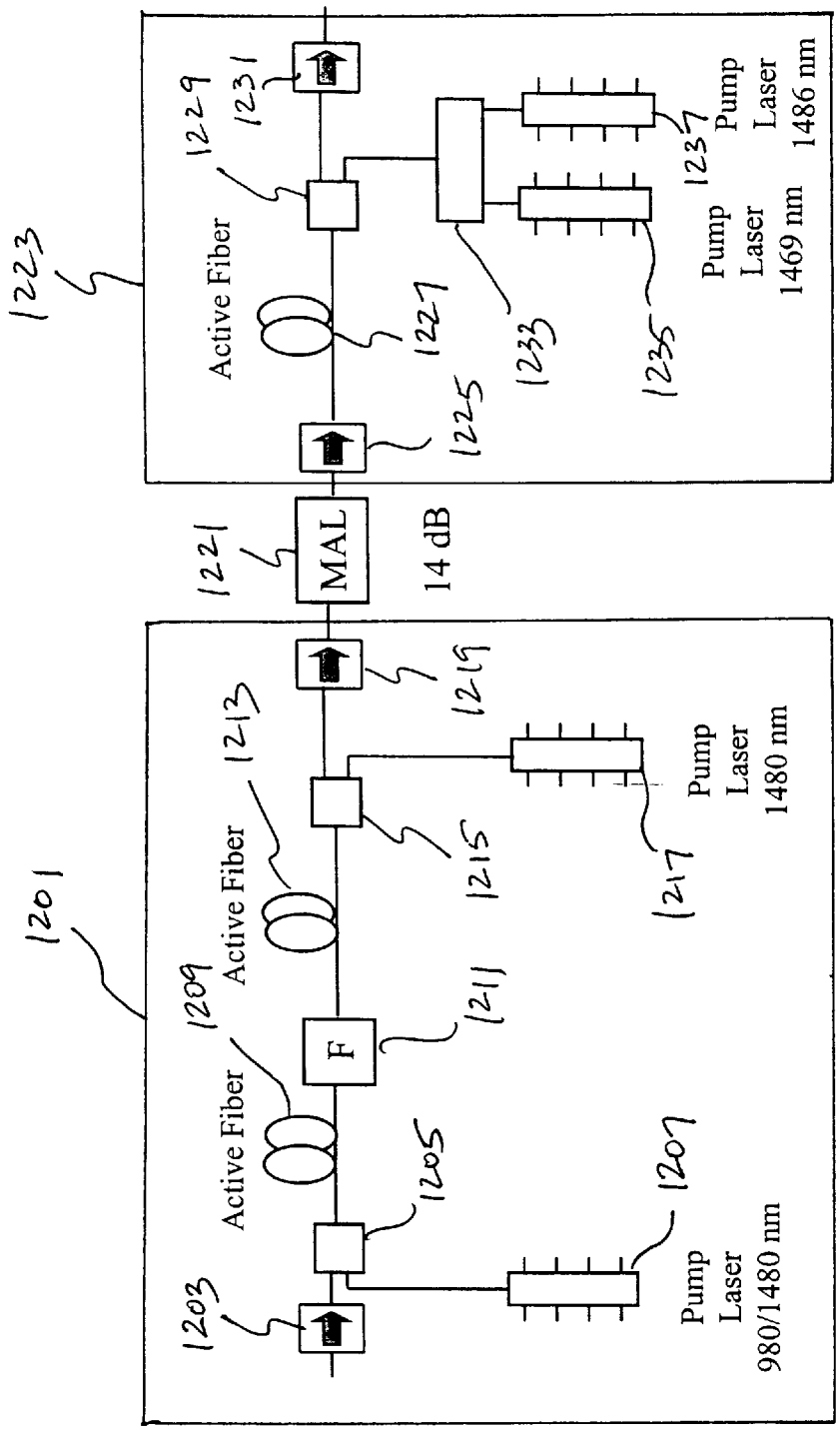
Fig. 12a: Amplifier structure

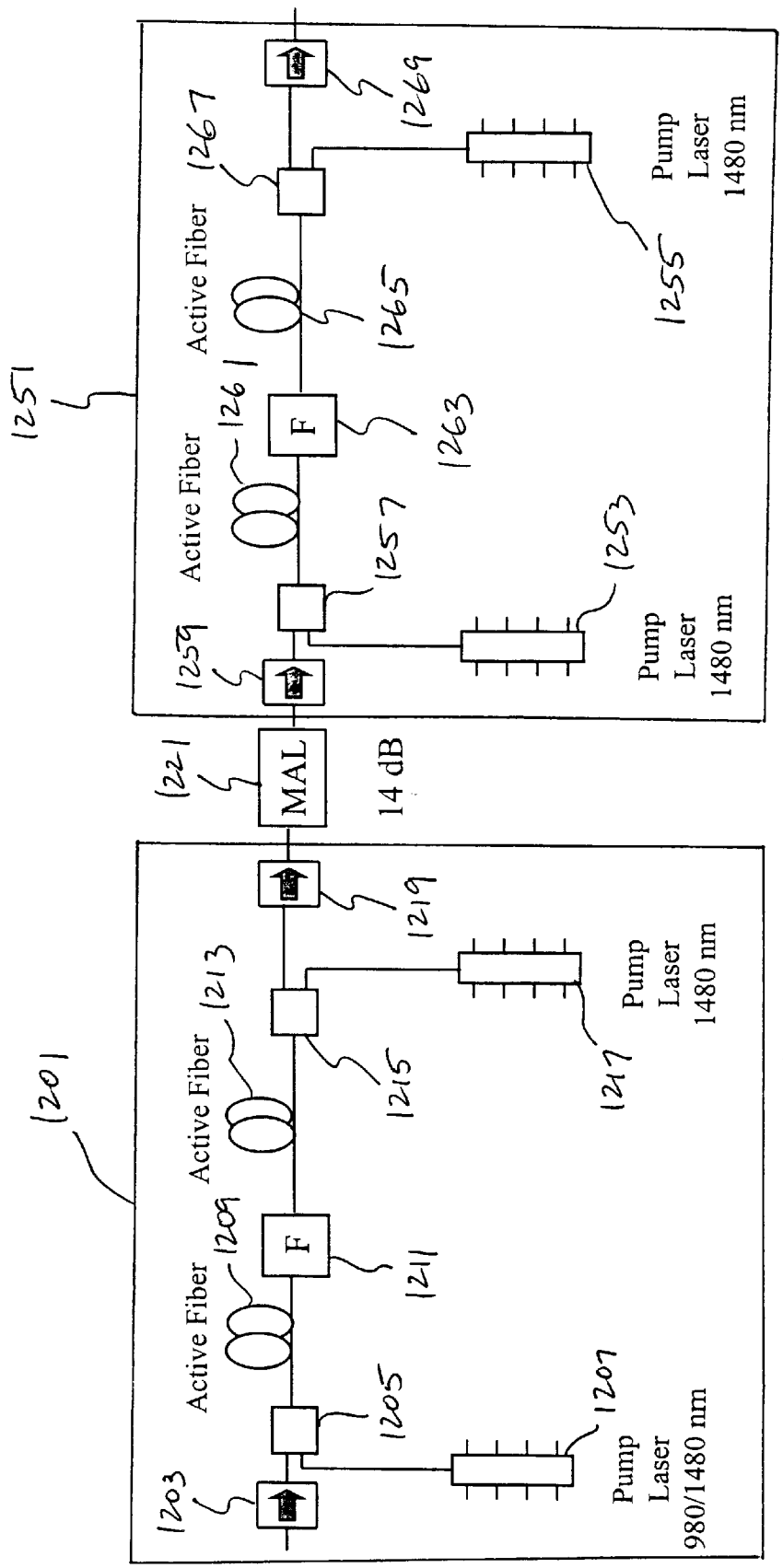
Fig. 12b: Amplifier structure

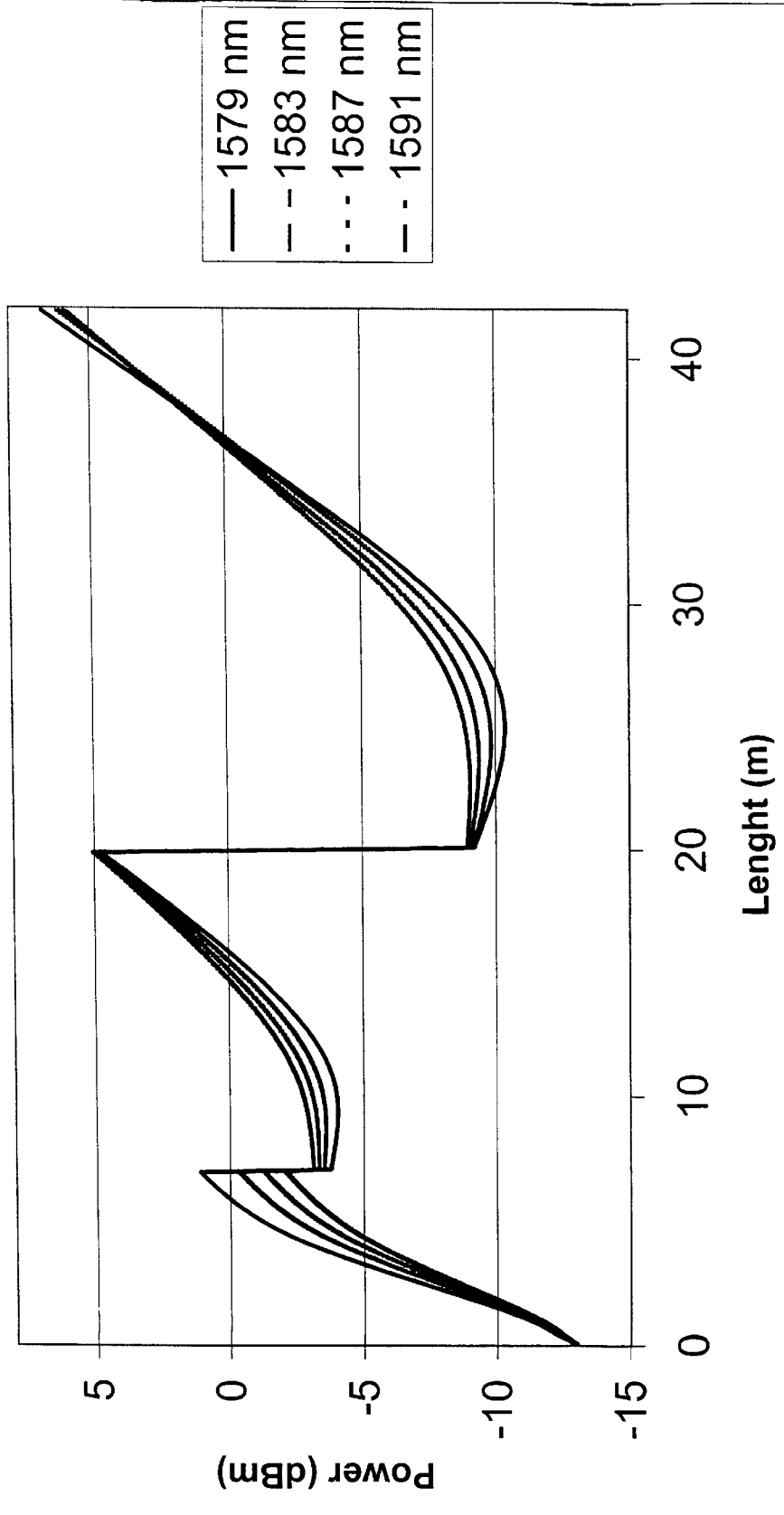

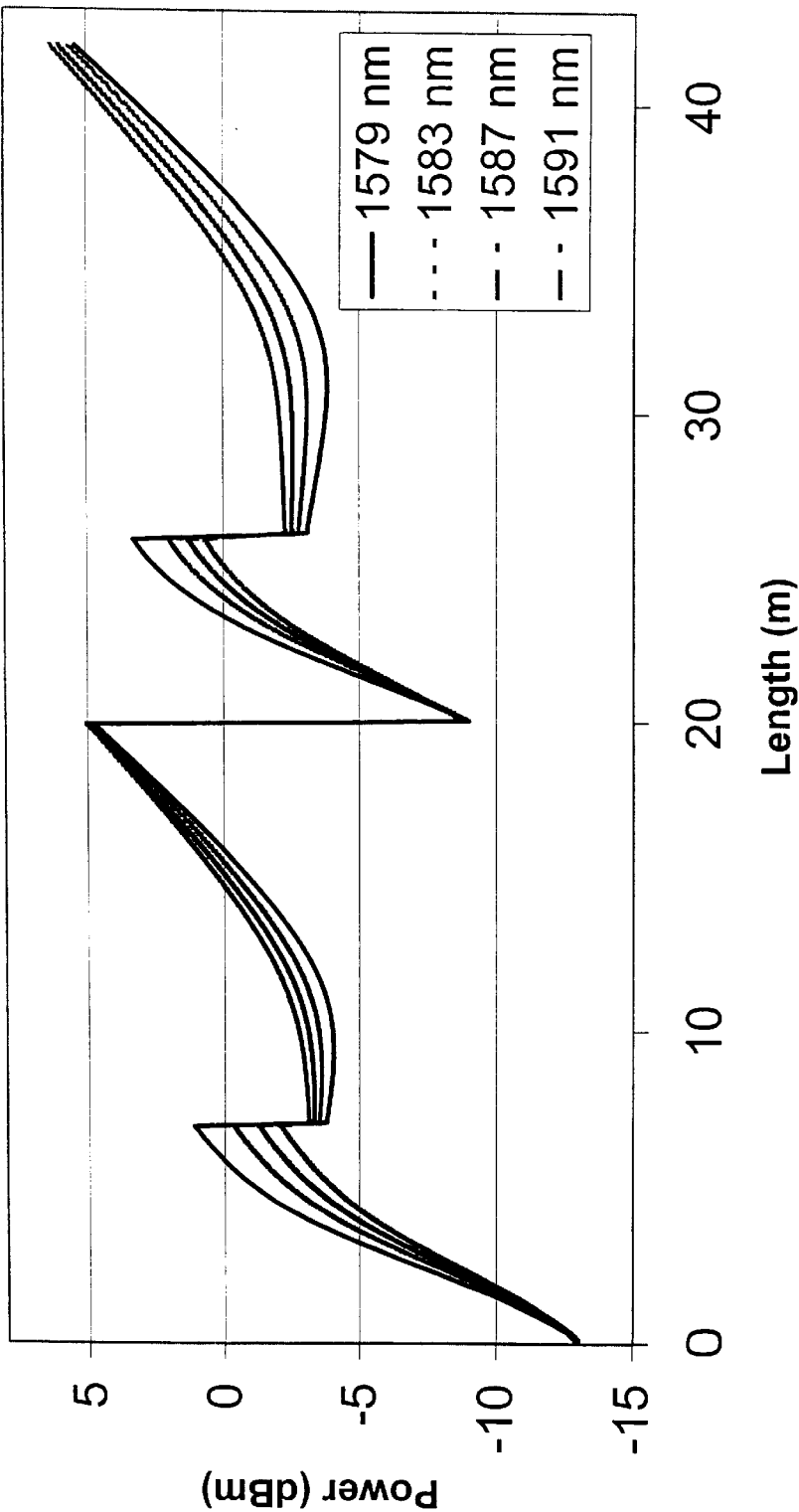
FIG. 13 b: Signal power vs fiber length

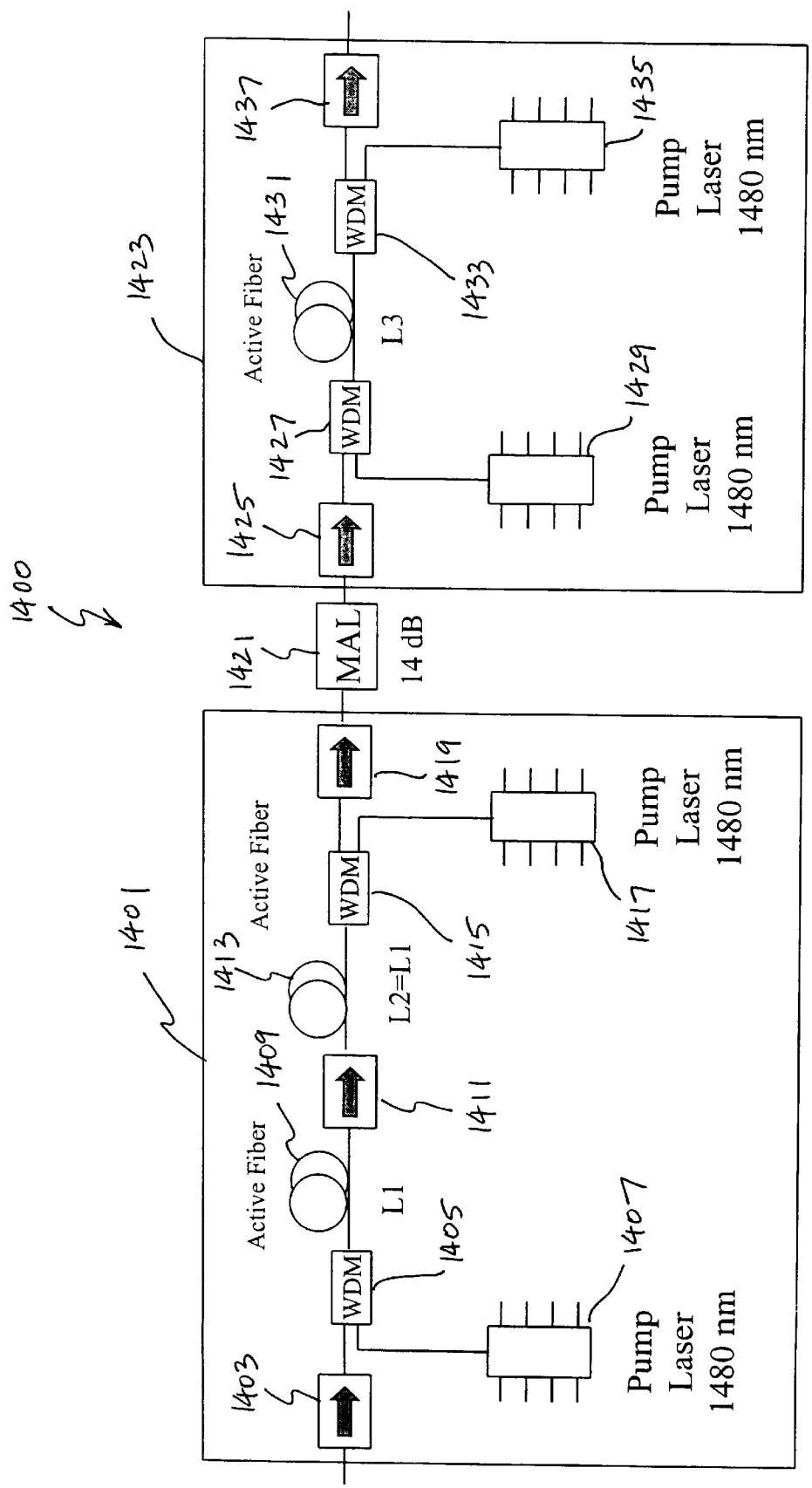
Fig. 14: Pre+booster amplifier structure without filter (TRADITIONAL)

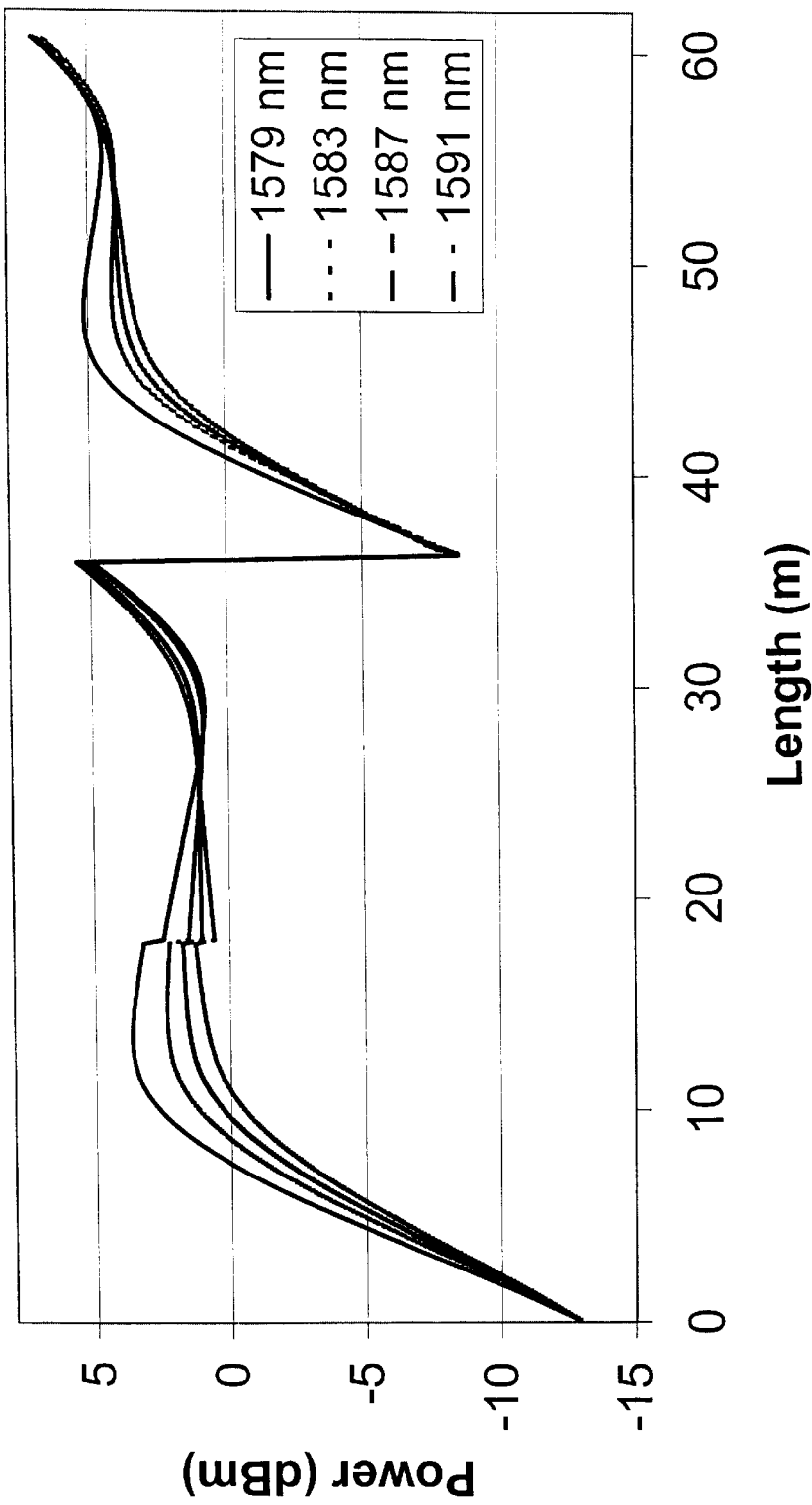

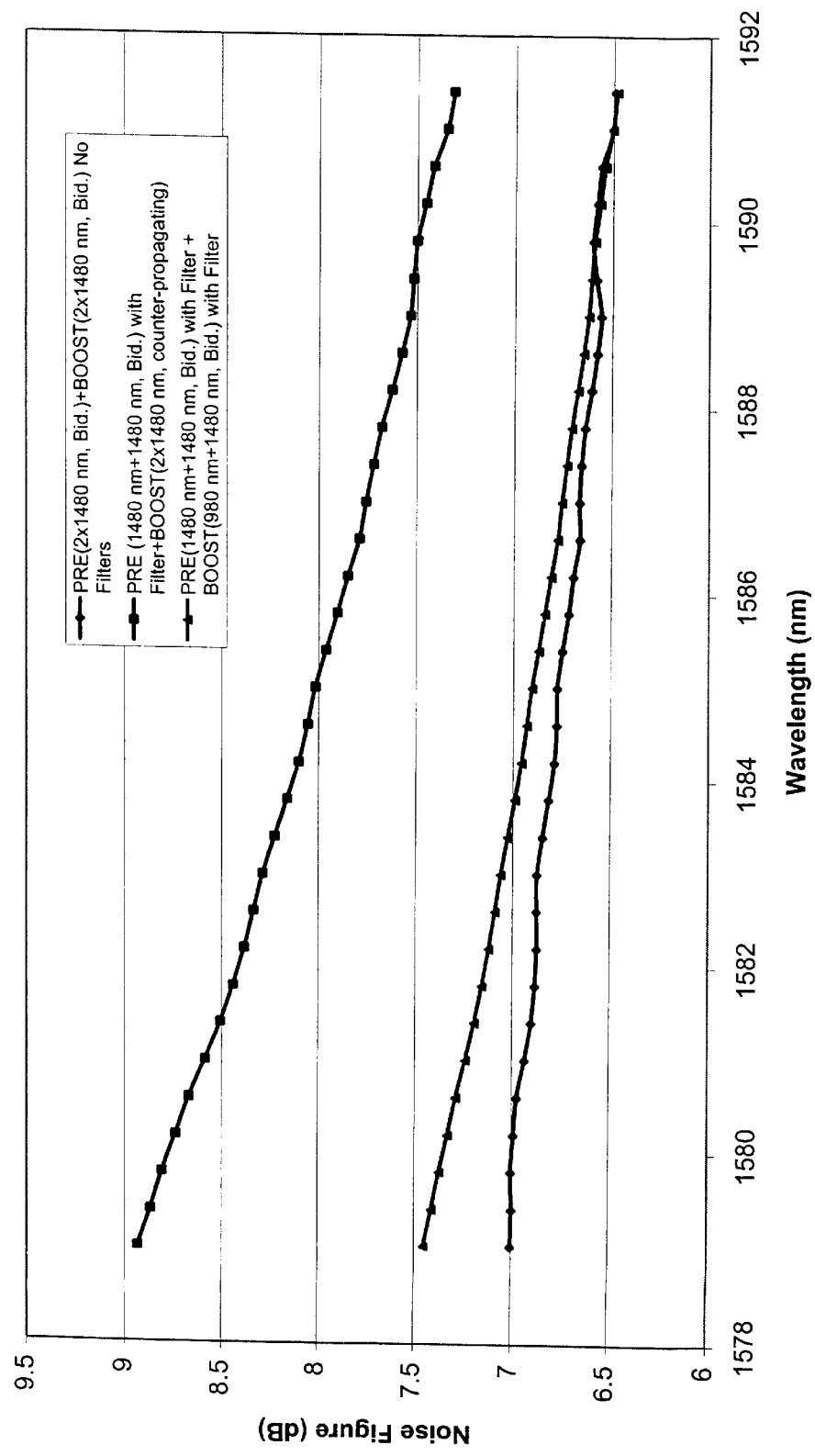

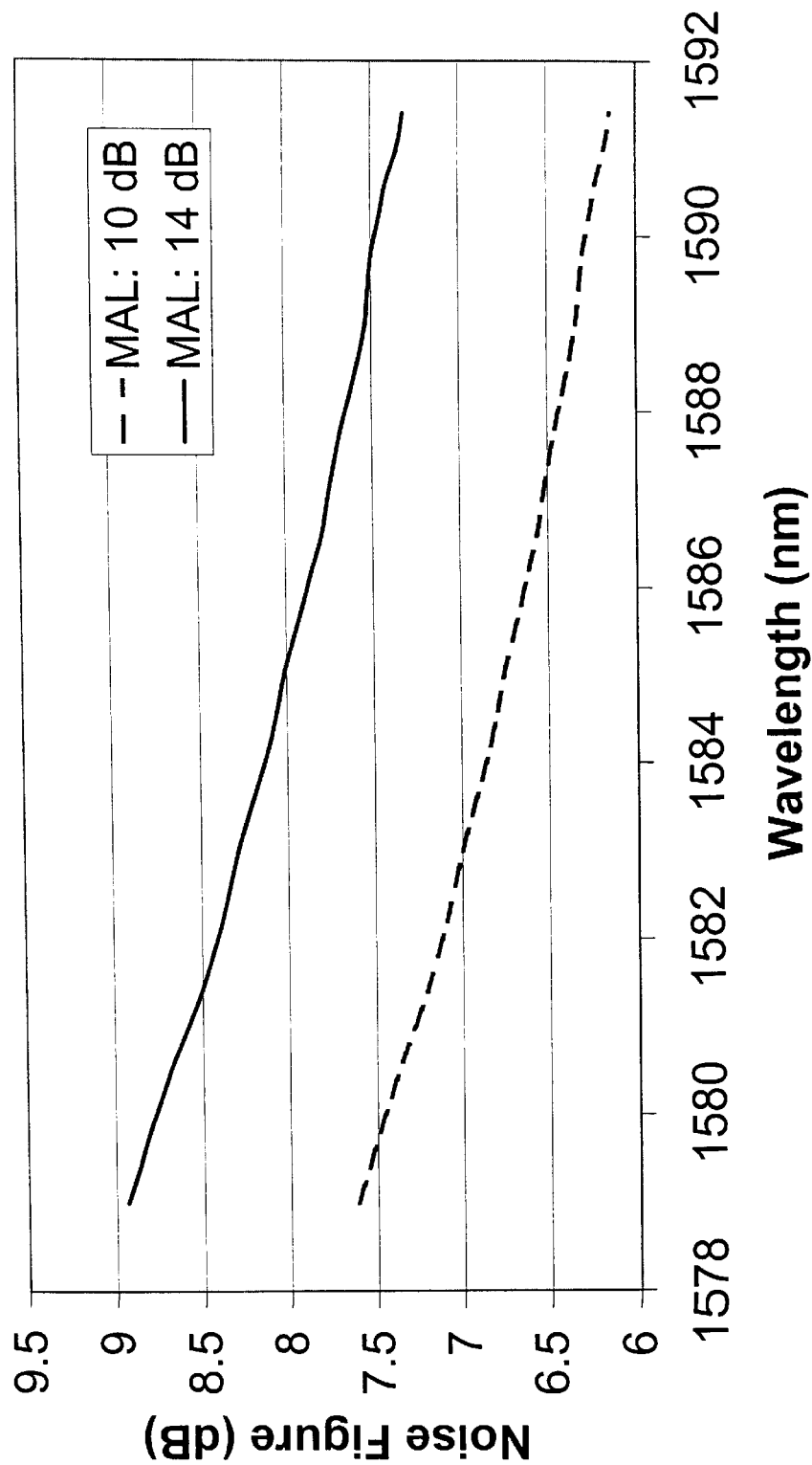

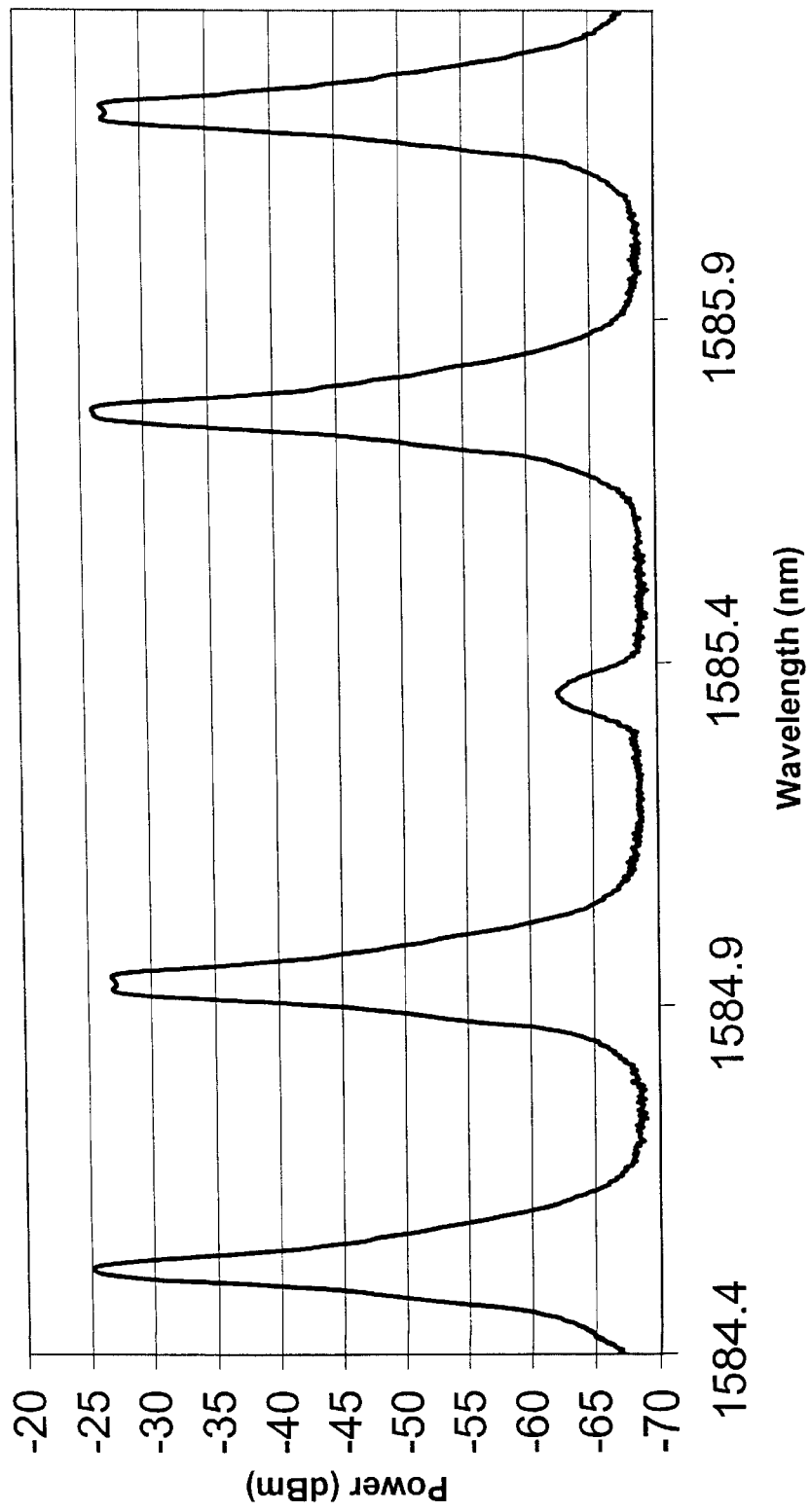
Fig. 18a: measured FWM product under the middle channel (32 WDM channels, 50 GHz spacing, PRE+BOOSTER)

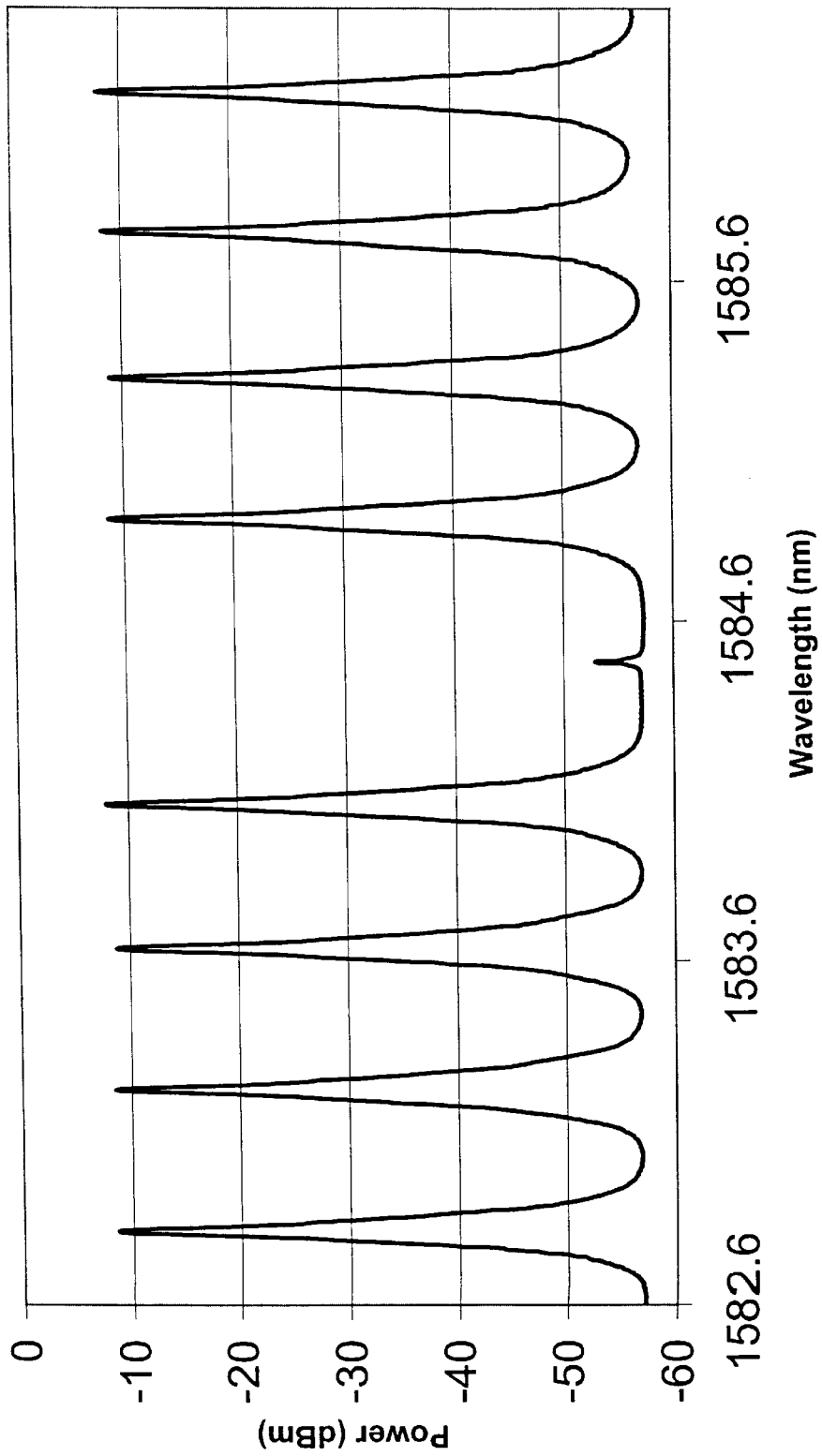
Fig. 18b: Output spectrum from the optimized pre+booster amplifier (FWM XT: -45 dB)

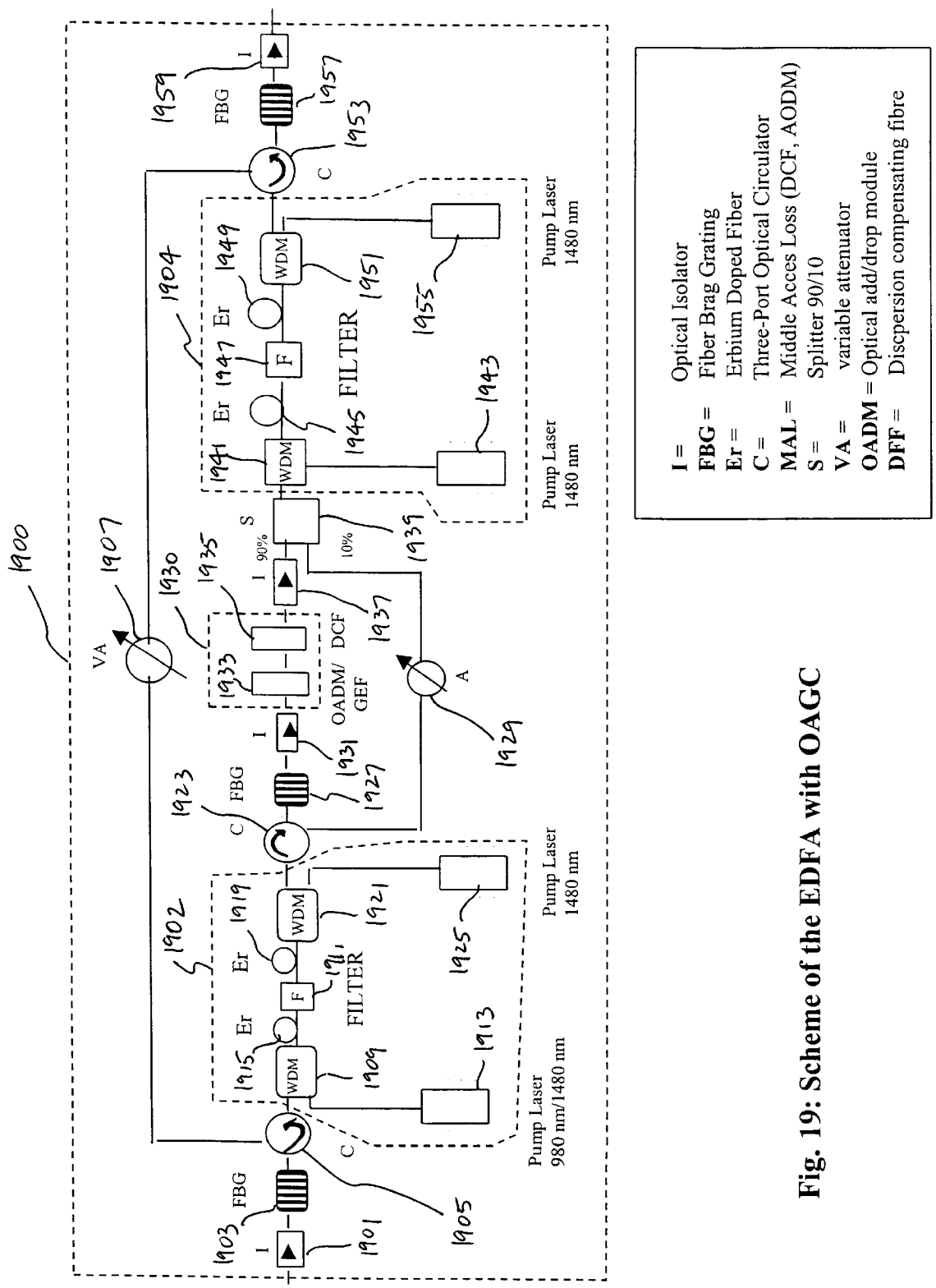
Fig. 19: Scheme of the EDFA with OAGC

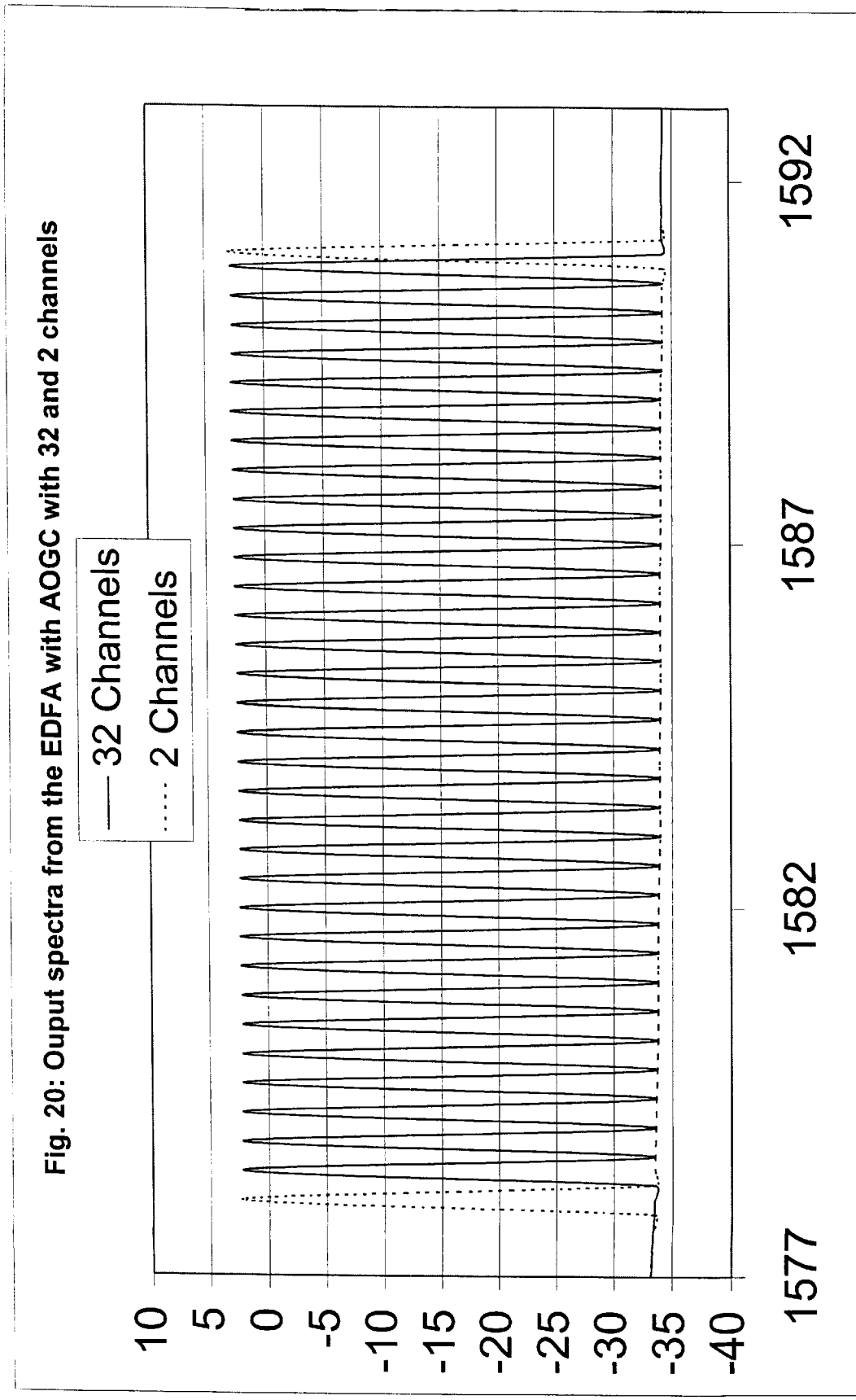
Fig. 20: Ouput spectra from the EDFA with AOGC with 32 and 2 channels

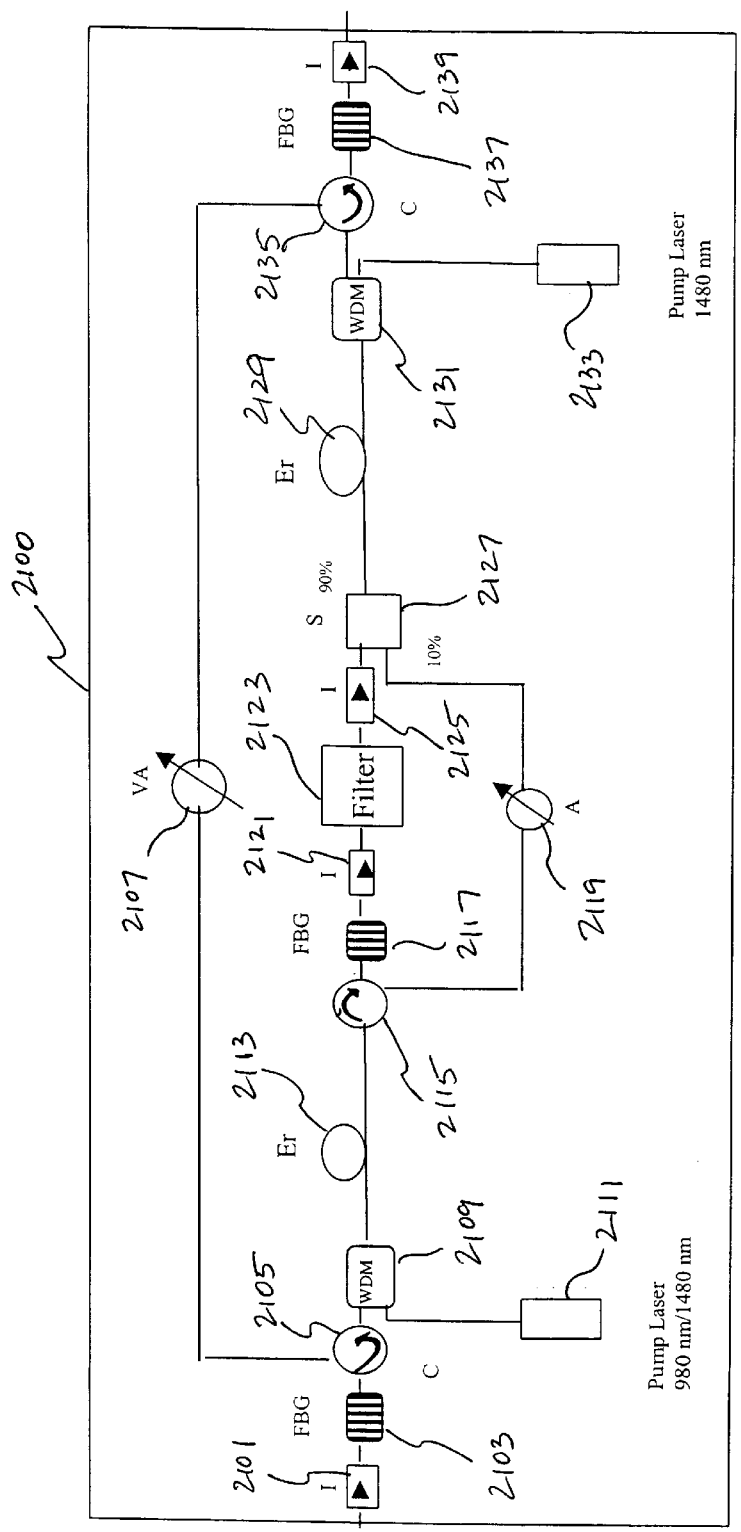
Fig. 21: Scheme of the EDFA with OAGC (single stage structure)

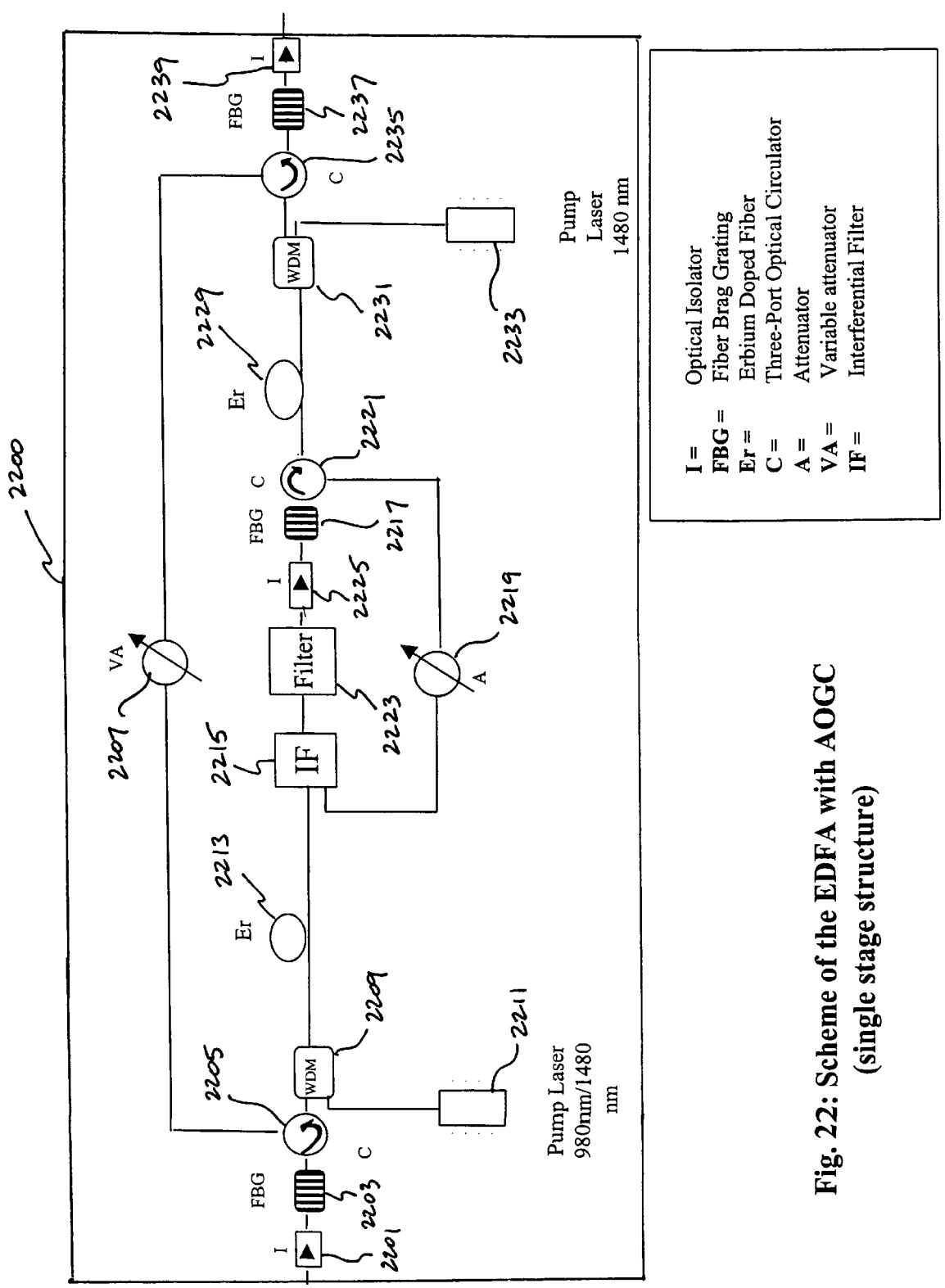
Fig. 22: Scheme of the EDFA with AOGC (single stage structure)

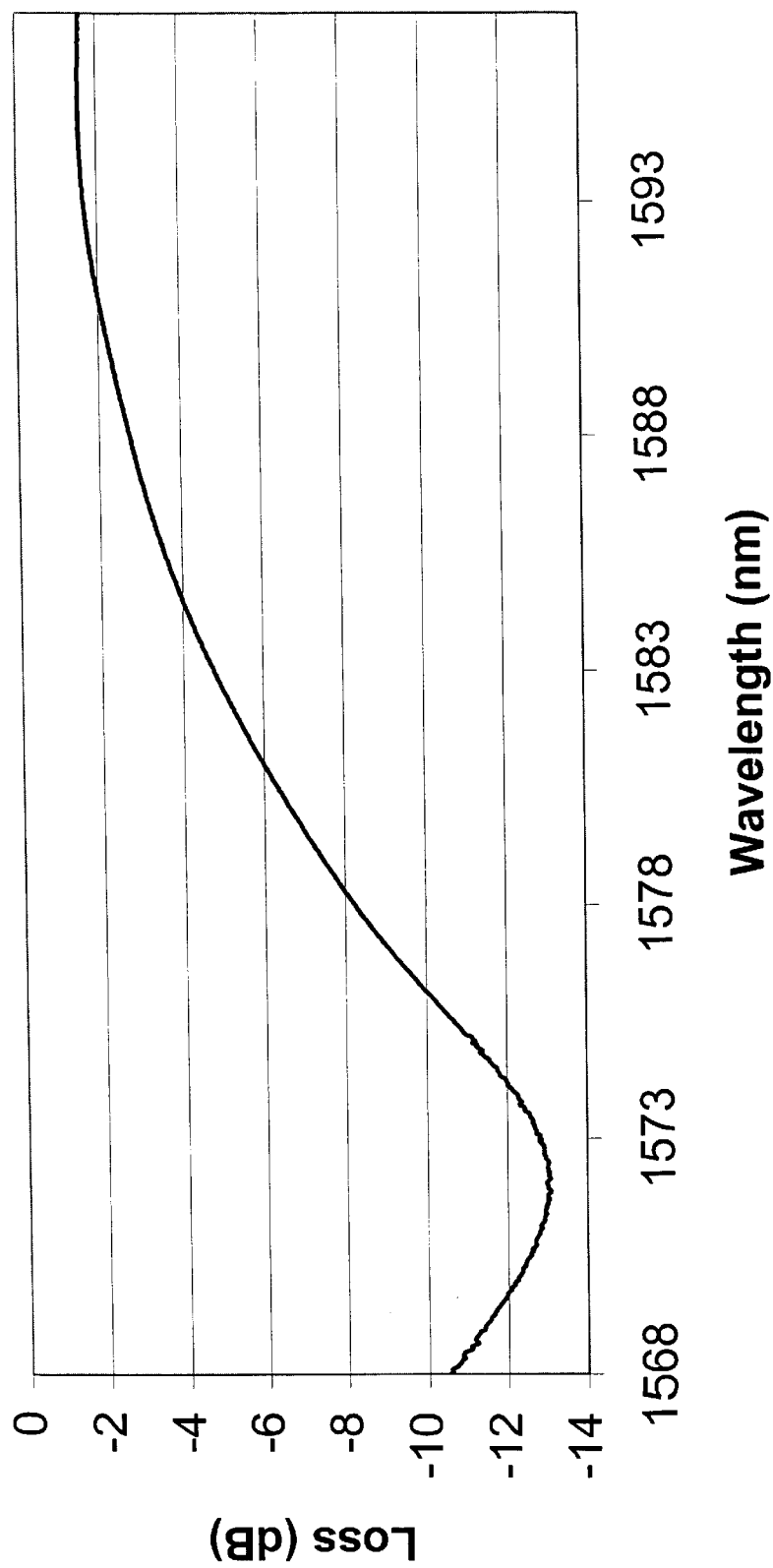
Fig. 23: spectral shape of the inverting filter within the EDFA structure of Fig. 22

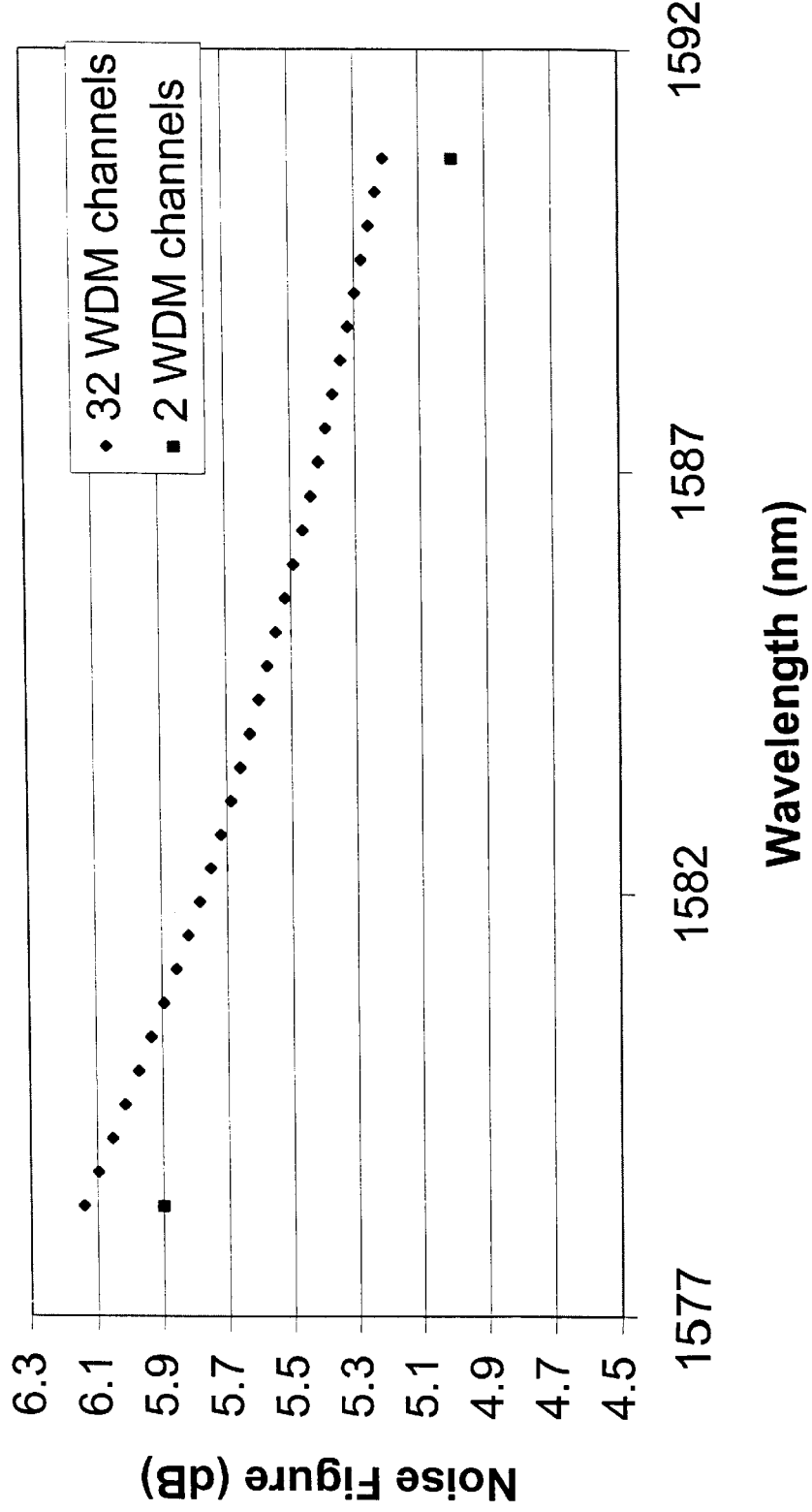
Fig. 24: Noise figure comparison between fully loaded EDFA and only two input channels EDFA with AOGC

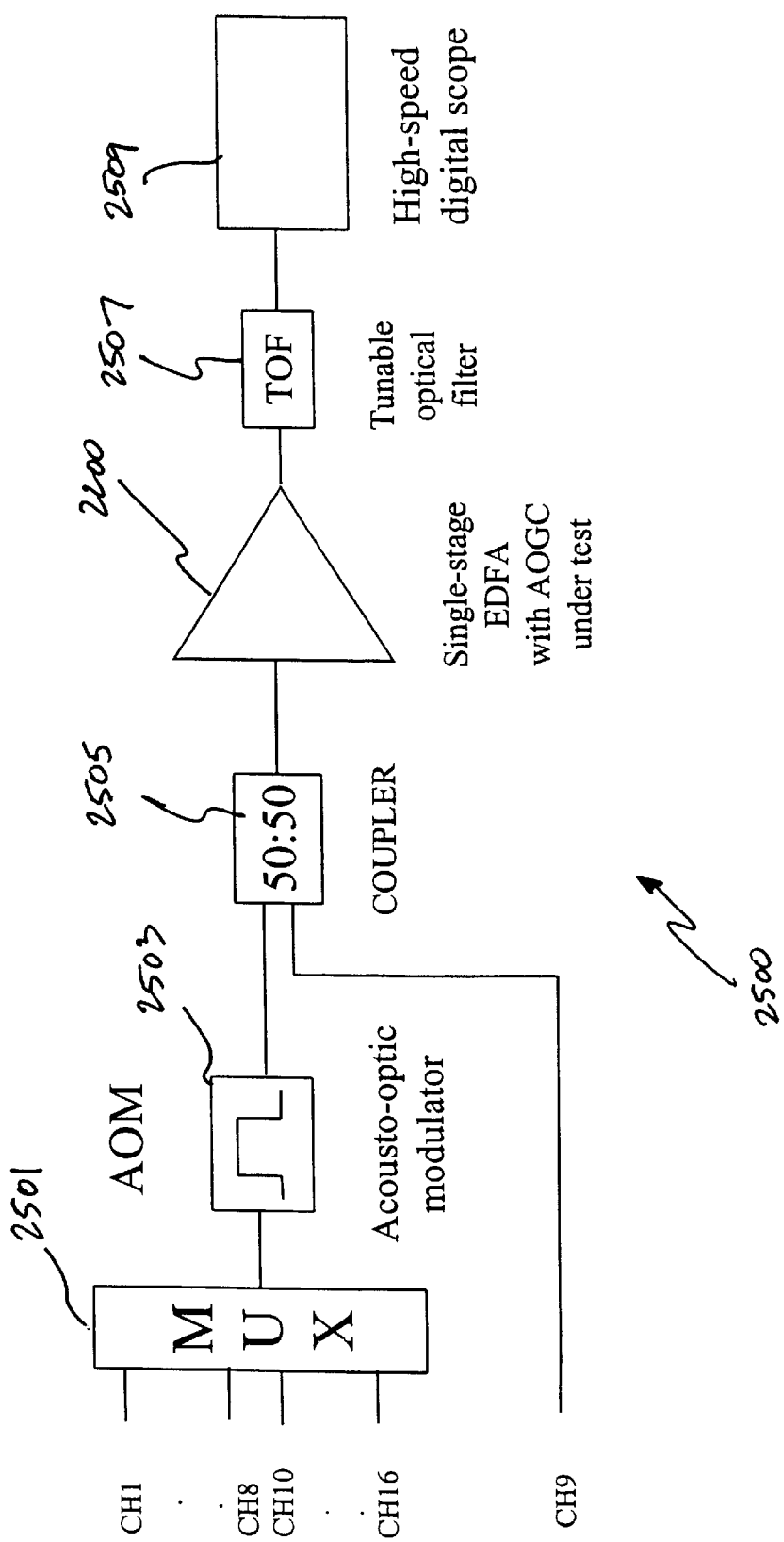
Fig. 25: Experimental set-up for power transient measurement

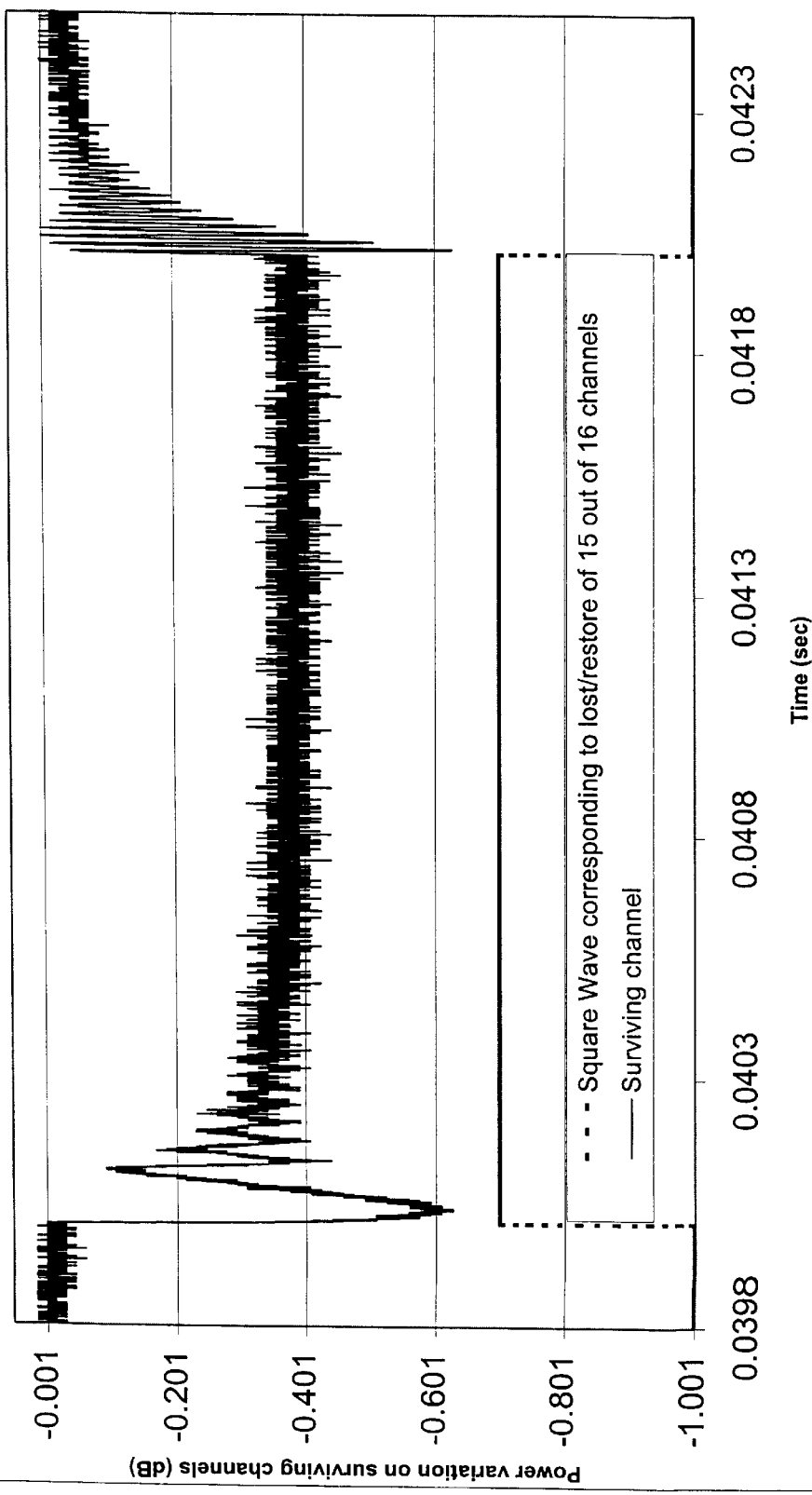
FIG. 26: Transient response of surviving channel output power to drop/add of 15 out of 16 WDM channels

ALL-OPTICAL GAIN CONTROLLED L-BAND EDFA STRUCTURE WITH REDUCED FOUR-WAVE MIXING CROSS-TALK

BACKGROUND OF THE INVENTION

1. Field of the Invention

The present invention relates to optical communication systems, and is more particularly related to an Erbium Doped Fiber Amplifier (EDFA) for minimizing four-wave mixing cross-talk.

2. Discussion of the Background

The explosion of communication services, ranging from video teleconferencing to electronic commerce, has spawn a new era of personal and business interactions. As evident in the enormous growth of Internet traffic, consumers have begun to embrace information technology, viewing it, in some cases, as much a necessity as the telephone. However, this new mindset poses many challenges to the telecommunication industry to develop technology that will greatly expand the bandwidth limitations of existing communication systems. Optical communications holds great promise to meet the continual demands for greater and greater bandwidth.

Wavelength Division Multiplexing (WDM) technology, in particular Dense WDM (DWDM), permits the concurrent transmission of multiple channels over a common optical fiber. The advent of Erbium Doped Fiber Amplifiers (EDFA) has accelerated the development of WDM systems by providing a cost-effective optical amplifier that is transparent to data rate and format. EDFAs amplify all the wavelengths simultaneously, enabling the composite optical signals to travel large distances (e.g., 600 km) without regeneration. Further, many advances in EDFA components and performance are underway to increase the bandwidth of EDFAs even more.

Not surprisingly, Internet services over WDM systems have garnered tremendous attention in the telecommunications industry. Notably, the industry has focused on the design of ultra-long systems (e.g., 1500–3000 km) that are capable of transporting high number of channels without optical regeneration.

L-band EDFAs are attracting a great deal of attention to increase the capacity of WDM optical communication systems. The physical mechanism of these amplifiers is substantially different from the conventional band (i.e., C-band) EDFA. In particular, they operate at low average inversion, and thus, require use of longer active fibers. However, four-wave mixing (FWM) efficiency within the active fiber is increased, leading to numerous serious system penalties. The effect is particularly detrimental in ultra-long-haul WDM systems in which there are many cascaded amplifiers.

The generation of FWM cross-talk (XT) within the EDFA differs from that of a transmission fiber. This is mainly due to the fact that the nonlinear effective length in the EDFA is much longer than the active fiber length. As a result, this gives rise to complicated mechanisms concerning the dependence of the FWM efficiency from channel separation, channel number, fiber length, signal power, and chromatic dispersion.

EDFAs operating in C-band are much less affected by this problem because of the shorter active fiber length.

Based on the foregoing, there is a clear need for minimizing FWM XT while maintaining a low noise figure by providing an optimized L-band EDFA with all-optical-gain-control (AOGC).

There is also a need to perform all-optical-gain-control with reduced transient power excursion in surviving channels induced by adding/dropping of channels.

There is also a need to reduce the length of the active fibers.

There is a further need to minimize the non-linear effects of the active fibers.

Based on the need to improve the performance of an optical communication system, an approach for reducing FWM cross-talk in an L-band EDFA is highly desirable.

SUMMARY OF THE INVENTION

According to one aspect of the invention, a method for minimizing four-wave mixing cross-talk in a WDM (wavelength division multiplexing) optical communication system is disclosed. The method includes injecting a co-propagant pump light into a first active fiber to induce high inversion in a portion of the first active fiber. The method also includes filtering WDM signals from the first active fiber to invert the gain tilt of the WDM signals. The method further encompasses injecting a counter-propagant light into a second active fiber to induce high inversion in a portion of the second active fiber. Under this approach, the FWM XT is reduced, along with the noise figure.

According to another aspect of the invention, an Erbium doped fiber amplifier (EDFA) apparatus operating in an L-band of a WDM communication system comprises a pre-amplifier that is configured to receive an input optical signal and to output an amplified input optical signal. The pre-amplifier includes the following components: a first active fiber that carries WDM signals; a co-propagating pump laser that is configured to induce high inversion in a portion of the first active fiber; a filter that is coupled to the first active fiber and configured to invert gain tilt of the WDM signals; a second active fiber that is coupled to the filter; and a counter-propagating pump laser that is configured to induce high inversion in a portion of the second active fiber. An optical unit may be coupled to the pre-amplifier and is configured to receive the amplified input signal, in which the optical unit introduces a prescribed loss to the WDM system. A booster amplifier is coupled to the optical unit and is configured to amplify a signal that is output from the optical unit. The above arrangement advantageously minimizes the non-linear effects of the active fiber.

According to yet another aspect of the invention, optical amplifier device for minimizing four-wave mixing cross-talk comprises a first active fiber configured to carry wave division multiplexing (WDM) signals corresponding to an operating band. A co-propagating pump laser is configured to induce high inversion in a portion of the first active fiber. A filter is coupled to the first active fiber and is configured to invert the gain tilt of the WDM signals. A second active fiber is coupled to the filter. A counter-propagating pump laser is configured to induce high inversion in a portion of the second active fiber. The above arrangement advantageously improves noise figure performance.

According to yet another aspect of the invention, optical amplifier apparatus operating in an L-band of a WDM communication system comprises a pre-amplifying means for receiving an input optical signal and for outputting an amplified input optical signal. The pre-amplifying means comprises a first active fiber that carries wave division multiplexing (WDM) signals, a co-propagating pumping means for inducing high inversion in a portion of the first active fiber, a filtering means coupled to the first active fiber for inverting tilt of the WDM signals, a second active fiber coupled to the filtering means, and a counter-propagating pumping means for inducing high inversion in a portion of the second active fiber. The apparatus also includes means coupled to the pre-amplifying means for receiving the amplified input signal and for introducing a prescribed loss to the WDM system. An amplifying means amplifies a signal that is output from the means for introducing the prescribed loss. The above arrangement reduces other non-linear effects within the active fiber, such as cross-phase-modulation.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 4a and 4b are graphs of the signal powers versus fiber length associated with the pre-amplifier structure of FIG. 2 using different pump laser configurations;

FIG. 5 is a diagram of a traditional L-band pre-amplifier structure with 1480 nm bi-directional pumping (without a filter);

FIG. 6 is a graph showing signal powers versus fiber length of the pre-amplifier structure of FIG. 5;

FIG. 7 is a graph of the noise figure (NF) comparison of three pre-amplifier structures;

FIG. 8 is a diagram of a system for measuring Four-Wave-Mixing (FWM) Cross-talk (XT);

FIG. 9 is a graph of the measured output spectrum for a non-optimized pre-amplifier structure of FIG. 5;

FIG. 10 is a graph of the computed output spectrum for a non-optimized pre-amplifier structure of FIG. 5;

FIGS. 11a and 11b are graphs of the computed and measured output spectra, respectively, for an optimized pre-amplifier structure, in accordance with an embodiment of the present invention;

FIGS. 12a and 12b are diagrams of optimized pre-amplifier and booster amplifier systems, in accordance with an embodiment of the present invention;

FIGS. 13a and 13b are graphs of the signal powers versus fiber length of the systems of FIGS. 12a and 12b, respectively;

FIG. 14 is a diagram of a traditional pre-amplifier and booster amplifier system without optimization for FWM XT reduction;

FIG. 15 is a graph of signal powers versus fiber length for the non-optimized pre-amplifier and booster amplifier system of FIG. 14;

FIG. 16 is a graph of the NF comparison for the pre-amplifier and booster amplifier systems of FIGS. 12a, 12b, and 14;

FIG. 17 is a graph of the NF comparison with different Middle Access Loss (MAL) for the optimized pre-amplifier and booster amplifier system (counter-propagating pumping at 1480 nm in the booster amplifier);

FIGS. 18a and 18b are graphs of the measured output spectrum for the non-optimized pre-amplifier and booster amplifier system and the computed output spectrum for the optimized pre-amplifier and booster amplifier system, respectively;

FIG. 19 is a diagram of an EDFA with an Automatic Optical-Gain-Control (AOGC) mechanism used in a two-stage amplifier structure, in accordance with an embodiment of the present invention;

FIG. 20 is a graph of the output spectra of 32 and 2 WDM channels systems with AOGC;

FIG. 21 is a diagram of an EDFA with AOGC used in a single stage amplifier structure, in accordance with an embodiment of the present invention;

FIG. 22 is a diagram of an EDFA with AOGC used in a single stage amplifier structure utilizing an interferential filter (IF), in accordance with an embodiment of the present invention;

FIG. 23 is a graph of the response of the inverting filter in the amplifier structure of FIG. 22;

FIG. 24 is a graph of the NF comparison for the amplifier structure of FIGS. 22 with 32 and only 2 WDM input signals;

FIG. 25 is a diagram of the experimental set-up used to measure power transients; and FIG. 26 is a graph of the transient response of the surviving channel output power to dropping/adding 15 out of 16 WDM channels.

DESCRIPTION OF THE PREFERRED EMBODIMENTS

In the following description, for the purpose of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

The present invention provides an Erbium doped fiber amplifier (EDFA) that operates within the L-band of a WDM communication system. A pre-amplifier receives an input optical signal, and outputs an amplified input optical signal to a middle access loss (MAL) component. The pre-amplifier includes a first active fiber that carries wave division multiplexed (WDM) signals corresponding to the L band. A co-propagating pump laser, within the pre-amplifier, induces high inversion in a portion of the first active fiber. The pre-amplifier also includes a filter that is coupled to the first active fiber, inverts the gain tilt of the WDM signals and suppresses the ASE lights accumulated at shorter wavelengths compared to the signal band. A counter-propagating pump laser of the pre-amplifier induces high inversion in a portion of the second active fiber. Optionally, a booster amplifier is utilized to increase the signal power of the optical signals from the MAL, which may be any individual or combination of the following components: an optical add/drop module, a gain equalizing filter (GEF), or a dispersion compensating fiber (DCF).

Although the present invention is discussed with respect to ultra-long-haul dense WDM systems, the L-band EDFA has application to other types of WDM optical communication systems.

Figure 1:
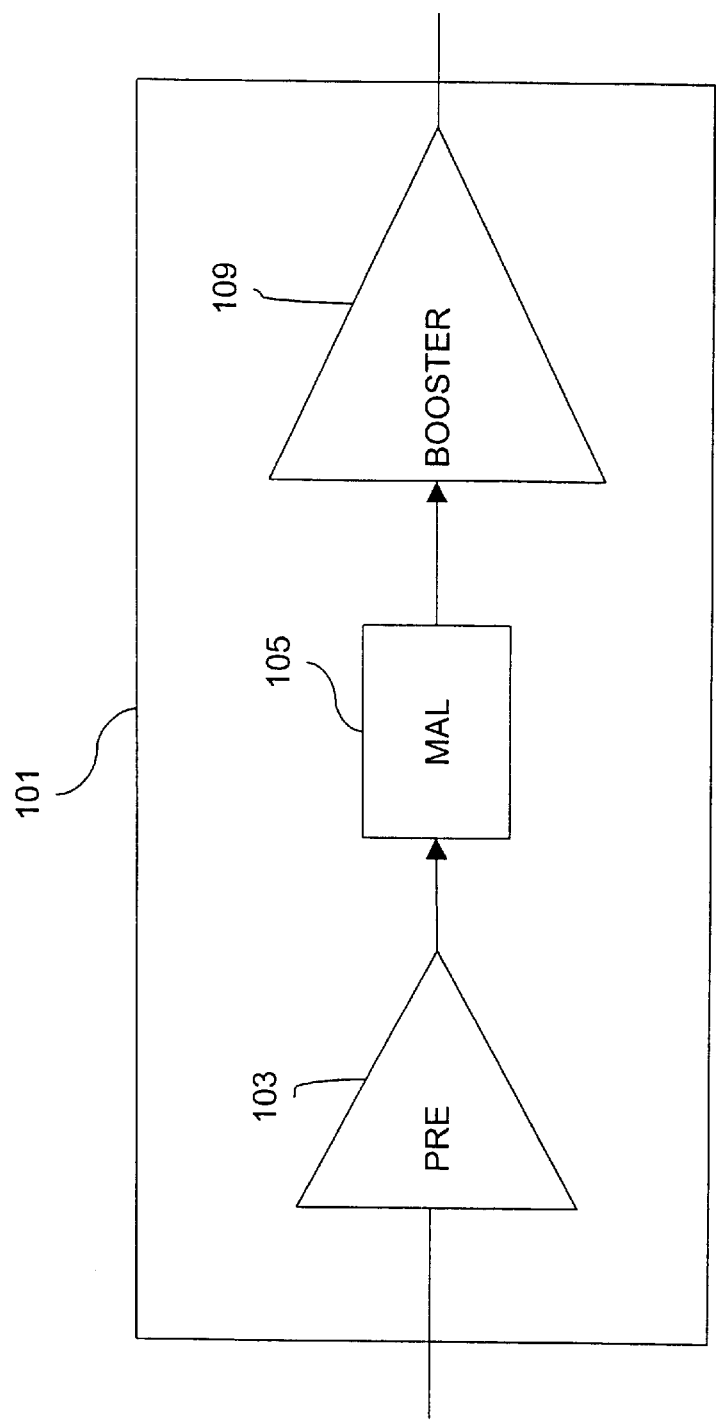
FIG. 1 is a block diagram of an L-band Erbium doped Fiber Amplifier (EDFA), in accordance with an embodiment of the present invention.

FIG. 1 shows a block diagram of an L-band Erbium doped fiber amplifier (EDFA), in accordance with an embodiment of the present invention. L-band EDFA 101 is particularly applicable to ultra-long-haul DWDM optical communication systems based on distributed Raman amplification in which a high number of EDFAs and Raman amplifiers are cascaded to provide optical transparency over long transmission distances (up to several thousand kilometers). However, it is recognized by one of ordinary skill in the art that the various embodiments of the present invention can be applied generally to any type of WDM systems. As shown in FIG. 1, an EDFA 101 includes a pre-amplifier 103 that is connected to a Middle Access Loss 105, which represents loss associated with a particular component, such as an Optical Add/Drop Module (OADM), a Gain Equalizing Filter (GEF), a dispersion compensating fiber (DCF), or a combination thereof. The MAL 105 is coupled to a second amplifier; i.e., booster amplifier 109. The EDFA 101 operates in the extended band (L-band: 1570–1610 nm) and can be applied, for example, to ultra-long-haul dense WDM (DWDM) optical communication systems.

The pre-amplifier 103 and the booster amplifier 109, employ numerous active fibers, which are Erbium doped (not shown). According to one embodiment of the present invention, the EDFA 101 is optimized with respect to the active fiber parameters and configurations of the pre-amplifier 103 and the booster amplifier 109 to minimize the non-linear effects of four-wave-mixing cross-talk that is generated within the active fiber, without degradation of the amplifier noise figure (NF). As will be more filly described, optimization is achieved through the use of increased Erbium concentration in the active fibers and filtering to control gain tilt.

In general, the noise figure performance of a pre-amplifier and booster amplifier structure 101 is mainly dictated by the pre-amplifier gain and by the middle access loss (MAL) 105. In the presence of high pre-amplifier gain and low MAL 105, there is great flexibility in the architecture of the booster amplifier 109.

Figure 2:
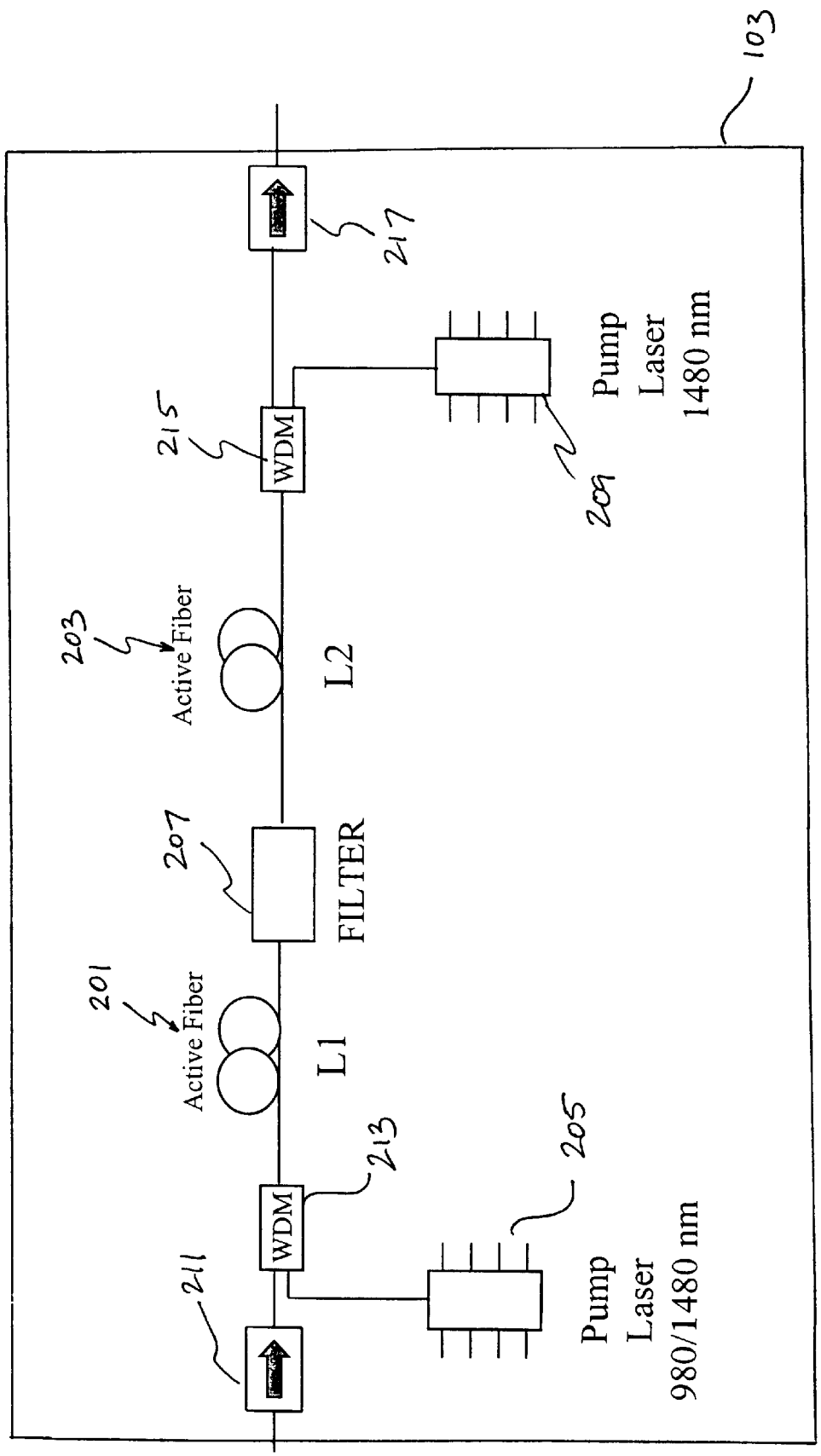
FIG. 2 is a diagram of a pre-amplifier structure used in the system of FIG. 1.

FIG. 2 shows a diagram of a pre-amplifier structure used in the system of FIG. 1. As mentioned above, the pre-amplifier 103 is instrumental in ensuring good NF performance, while minimizing FWM XT. Optimization of the active fiber parameters to reduce FWM XT (and in general nonlinear effects) can be achieved by increasing the effective area of the fiber (this parameter depends on the numerical aperture (NA) and cut-off wavelength). It should be noted that by increasing the effective area, nonlinear effects are reduced; however, amplifier efficiency decreases. Optimization can also be achieved by increasing the absolute value of the dispersion D (units ps/km nm), as well as reducing the nonlinear coefficient of the material acting on the fiber dopant composition and concentration. Further, increasing the Erbium concentration shortens the amplifier length.

Although the FWM XT in an L-band EDFA may be eliminated by fully optimizing the active fiber parameters, such optimization would not be sufficient to remove FWM XT in ultra-long-haul WDM systems in which many cascaded amplifiers are used. Reduction of the FWM XT is achieved by using the inverting filter, which further shortens the amplifier length, making the amplifier very attractive in terms of gain control behavior.

According to one embodiment of the present invention, active fibers 201 and 203 are highly doped alumino-silicate Erbium doped fibers, whose parameters are shown in Table I:

TABLE I

| NA | Cut-off Wavelength (nm) | Erbium peak absorption (dB/m) | Al % (Weight molar conc.) | Loss at 1200 nm (dB/km) | Absorption at 1480 nm (dB/m) |
| --- | --- | --- | --- | --- | --- |
| 0.27 | 970 | 15.2 | 2 | 21 | 2.3 |

Each of the active fibers 201 and 203 possesses a numerical aperture of 0.27 and is optimized to ensure good efficiency of L-band amplifiers, maintaining a high Erbium concentration to reduce the amplifier length. Using the same doping concentrations and geometrical parameters of the active fibers, a reduction of over 40% in length can be attained over the traditional L-band pre-amplifier (which does not include an inverting filter). Alternatively, the cut-off wavelength may vary from 950 nm to 1200 nm, depending on the pumping wavelength. The numerical aperture, thus, has a range of 0.21–0.29, in which the Erbium absorption peak ranges from 13–20 dB/m. Further, the A1% weight molar concentration varies from 1–4%.

Accordingly, reduction of FWM XT, while maintaining a low noise figure, requires the creation of an amplifier that is as "short" as possible by utilizing highly doped Erbium fibers and optimized structure. Other active fiber parameters encompass an effective area, chromatic dispersion, and non-linear coefficient. These three parameters can be optimized to reduce non-linear effects within the active fiber. However, for a given active fiber (e.g., 201 and 203), the longitudinal signal power variations along the active fiber also affect system performance; specifically, minimizing the integral of the signal power evolution along the active fiber yields minimum FWM XT. Minimization of the integral of the signal power can be achieved by pumping the active fiber in counter-propagating direction. However, this pumping scheme seriously degrades the NF performance, particularly if applied to the pre-amplifier 103.

Accordingly, pre-amplifier structure 103 uses a powerful co-propagating pump laser 205 (either at 1480 nm or 980 nm), which provides high pump power within the active fiber 201 (greater than 100 mW) to induce high inversion in the first meters of active fiber 201. An optical isolator 211 connects to a wavelength division multiplexer (WDM) 213, which combines the optical signals from the optical isolator 211 and the output of a 980 nm or a 1480 nm pump laser 205. As will be evident later, the 980 nm pump laser provides a slight improvement in NF performance over the 1480 nm pump laser embodiment. The active fiber 201 is coupled to a filter 207, which inverts the gain tilt among the WDM signals that are carried by the active fiber 201. In addition, the filter 207 suppresses the co-propagating amplified spontaneous emission (ASE) that is generated at shorter wavelengths. Furthermore, the pre-amplifier 103 includes a counter-propagating pump laser 209 at 1480 nm, which is connected to WDM 215 that is coupled to another optical isolator 217. The counter-propagating pump laser 209 allows high output power, while maintaining a low overall integral of the signal power along the active fiber 203. This active fiber 203 also provides gain equalization of the WDM signals.

The architecture of the pre-amplifier 103 can also be applied to the booster amplifier 109 (FIG. 1), as will be more fully discussed with respect to FIG. 12b. Because the noise figure of the EDFA 101 is mainly dictated by the pre-amplifier 103, the booster amplifier 109 can also be made by using a counter-propagating pumping scheme at 1469 nm and 1486 nm (FIG. 12a); however, in this embodiment, consideration of the MAL 105 is necessary to avoid NF penalties.

In one implementation of the pre-amplifier 103, assuming an optical communication system with 32 WDM channels (50 GHz spacing from 1579 nm to 1592 nm) and a total input power of 3 dBm, the pre-amplifier 103 provides up to 18.5 dBm output power with two 160 mW pump lasers 205 and 209.

Figure 3:
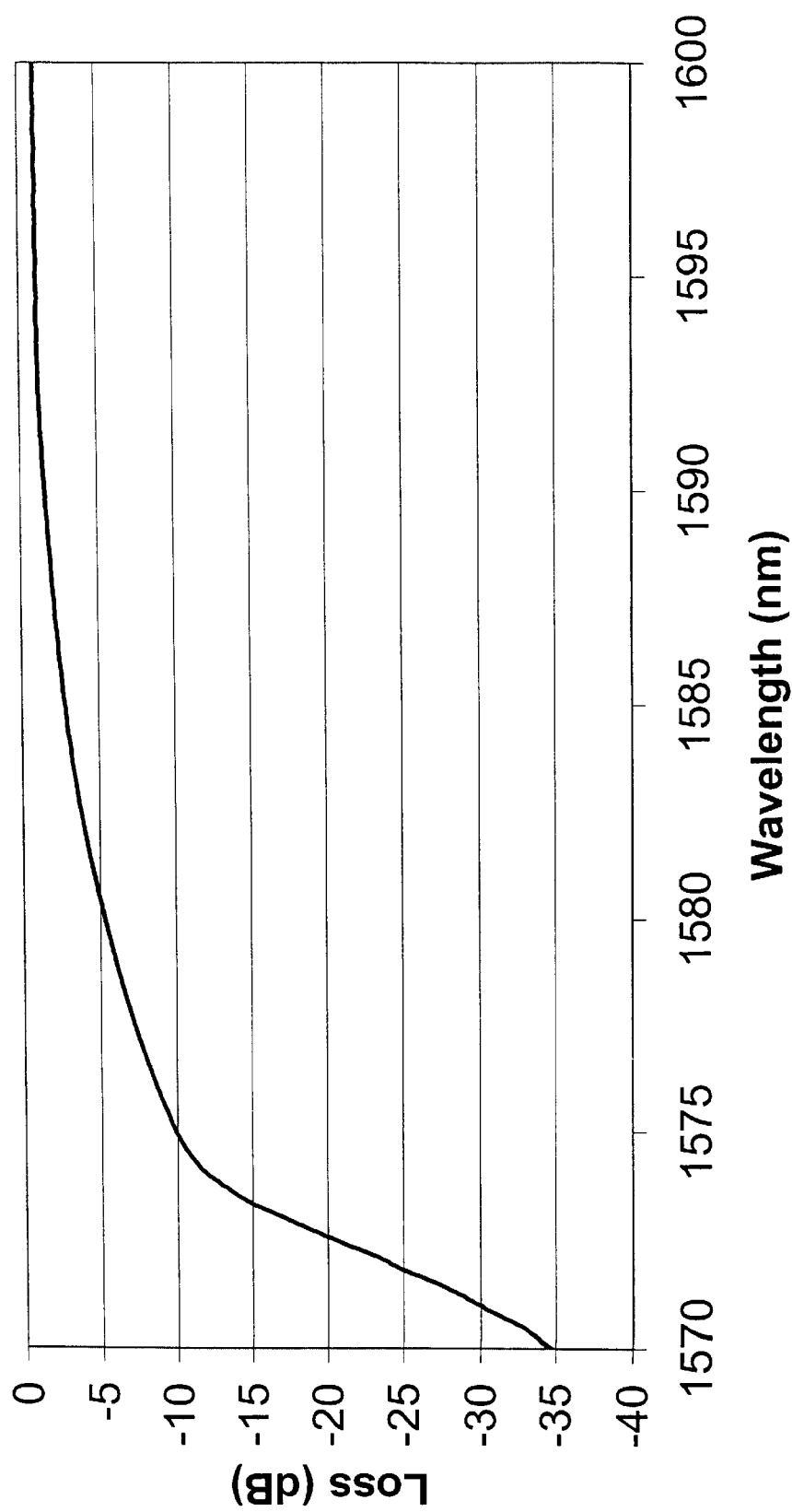
FIG. 3 is a graph of the response of the filter in the pre-amplifier structure of FIG. 2.

FIG. 3 shows a graph of the response of the filter in the pre-amplifier structure of FIG. 2. The filter 207 exhibits −35 dB loss at 1570 nm and −10 dB at 1575. The insertion loss of the filter is about 0.5 dB. This filter response provides slight inversion of the gain tilt and also suppresses the ASE lights accumulated at wavelengths shorter than the signal wavelengths, thereby enabling the shortening of the amplifier length. As a consequence, non-linear effects, such as FWM XT, can be minimized.

FIGS. 4a and 4b show graphs of the signal powers versus fiber length associated with co-propagating and counter-propagating pump lasers. In particular, FIGS. 4a and 4b show the power evolution for some of the 32 WDM channels along the active fiber 201, in which co-propagating pump lasers at 980 nm or 1480 nm and a counter-propagating pump laser at 1480 nm are utilized. For the purposes of explanation, the graphs show four representative channels (1579 nm, 1583 nm, 1587 nm, and 1591 nm) from the 32 channels of an exemplary WDM communication system. In a pre-amplifier structure 103 that employs co-propagating and counter-propagating pump lasers 205 and 209 (FIG. 2), FIG. 4a reveals that, with a 980 nm co-propagating pump laser and a 1480 nm counter-propagating pump laser, the active fiber 201 is about 7.0 m in length. At this point, the filter 207 provides inversion of the gain tilt and ASE suppression. With about 13 m of the second active fiber 203, the powers of the channels are nearly equivalent at about 5 dBm; it should be noted that the total output power from the amplifier is about 18.5 dBm because of the output loss of the EDFA).

FIG. 4b shows the power evolution of a pre-amplifier 103 in which both the co-propagating pump laser 205 and the counter-propagating pump laser 209 are at 1480 nm. The results are nearly identical to that of FIG. 4a. The 1480 nm co-propagating pump laser 205 yields slightly less power across the channels than the 980 nm co-propagating pump laser 205. Nonetheless, both configurations provide a shortened amplifier structure when compared to the traditional L-band pre-amplifier of FIG. 5.

FIG. 5 shows a diagram of a traditional pre-amplifier with 1480 nm bi-directional pumping. In contrast to the pre-amplifier of FIG. 2, pre-amplifier 501 does not utilize a filter and employs the same concentration of Erbium doping in the active fibers (Erbium peak absorption of about 15 dB/m). Pre-amplifier 501 includes an optical isolator 503, which outputs to a WDM 505. The WDM 505 also receives an optical signal from a co-propagating pump laser 507 at 1480 nm, and outputs to an Erbium doped active fiber 509, which is connected to another optical isolator 511. The optical isolator 511 couples to another active fiber 513. A WDM 515 connects to a counter-propagating pump laser 517 and an optical isolator 519. The length of active fiber 509 in the pre-amplifier 501 is approximately 36 m versus 20 m for the pre-amplifier 103 of FIG. 2.

FIG. 6 is a graph showing signal powers versus fiber length with 1480 nm bidirectional pumping of the system of FIG. 5. As in FIGS. 4a and 4b, four representative channels (1579 nm, 1583 nm, 1587 nm, and 1591 nm) are shown. With 80 mW for each of the 1480 nm pump lasers, the lengths of active fibers 509 and 513 are about 18 m. The graph exhibits a typical longitudinal variation, whereby power equalization is achieved for the four representative channels at about 36 m. The pre-amplifier of FIG. 2, by contrast, has a length of about 20 m, representing over a 40% decrease in length.

FIG. 7 shows a graph of the noise figure (NF) comparison of three pre-amplifier structures. The three pre-amplifier structures are as follows: (1) 980 nm co-propagating pump and 1480 nm counter-propagating pump with filter (corresponding to a solid line); (2) 1480 nm bidirectional pumps with filter (corresponding to a large dashed-line); and (3) 1480 nm bi-directional pumps without filter (corresponding to a small dashed-line). The first pre-amplifier structure yields the lowest NF across the band; it should be noted that pumping in the co-propagating direction at 980 nm provides the minimum NF, while inclusion of the filter advantageously provides for a minimum FWM XT.

FIG. 8 shows a diagram of a system for measuring FWM XT. A test system 800 measures the FWM XT and includes a multiplexer (MUX) 801 that combines 32 channels. The MUX 801 outputs the composite optical signal to a pre-amplifier 803. A variable attenuator 805 is connected to an optical spectrum analyzer (OSA) 807 to protect the OSA 807 from high powered signals. It should be noted that the FWM XT is measured in conditions that correspond to the worst case scenario with respect to FWM XT through the use of polarization maintaining laser sources (32 WDM channels equally spaced at 50 GHz) and the polarization maintaining MUX 801. By switching off the middle channel, the FWM product that is generated under the channel can be measured by the system 800. The middle channel is chosen because the effects of FWM XT are most prominent there.

FIG. 9 shows a graph of the measured output spectrum for a non-optimized pre-amplifier structure of FIG. 5. In particular, FIG. 9 shows the measured output spectrum from a pre-amplifier with 3 dBm total input power and 18.5 dBm output power. The FWM XT, which is calculated by subtracting the ASE noise, is about −38.5 dB. Numerical analysis also supports this measured FWM XT; the computed output spectrum for the same amplifier with symmetric bi-directional pumping at 1480 nm is shown in FIG. 10.

FIG. 10 shows a graph of the computed output spectrum for a non-optimized pre-amplifier structure. The output spectrum was computed using a Beam Propagation Method (BPM) model, which permits inclusion of gain in both the co-propagating and counter-propagating directions. The computed FWM XT is about −39 dB, which is very close to the measured value of −38.5 dB (FIG. 9).

In WDM optical communication systems, several amplifiers are cascaded. Accordingly, an acceptable FWM XT at the system output should be less than about −30 dB to ensure error free performance.

FIGS. 11a and 11b show graphs of the computed and measured output spectra, respectively, for an optimized pre-amplifier structure, in accordance with an embodiment of the present invention. The above FWM analysis is performed for the optimized pre-amplifier structure shown in FIG. 2; i.e., that of bidirectional pumping (co-propagating at either 1480 nm or 980 nm and counter-propagating at 1480 nm) with a filter inserted after about 7 m of active fiber. The output spectrum (computed without the middle channel with bi-directional pumping at 1480 nm) is shown in FIG. 11a. The FWM XT under the middle channel is about −47 dB with a reduction of about 9 dB.

FIG. 11b shows the measured output spectrum with the middle channel switched off. The FWM XT is very low and cannot be measured because of the ASE noise; thereby, confirming the effectiveness of the pre-amplifier structure of FIG. 2 in suppressing FWM nonlinear interaction. Further, pumping at 980 nm yields an NF improvement of more than 0.5 dB.

FIGS. 12a and 12b show diagrams of optimized pre-amplifier and booster amplifier systems, in accordance with an embodiment of the present invention. A pre-amplifier 1201, as shown in FIG. 12a, resembles that of the pre-amplifier 103 of FIG. 2. The pre-amplifier 1201 includes an optical isolator 1203 that is connected to a WDM 1205. The WDM 1205 couples to a co-propagating pump laser 1207 at 1480 nm, and outputs to an Erbium doped active fiber 1209, which is connected to a filter 1211. The filter 1211 inverts the gain tilt of the WDM signals and suppresses the ASE noise, forwarding the signals to active fiber 1213. A WDM 1215 connects to a counter-propagating pump laser 1217 and an optical isolator 1219. A MAL 1221 receives an output from pre-amplifier 1201 and transmits the output signal to a booster amplifier 1223.

Booster amplifier 1223 has an optical isolator 1225 that is attached to an active fiber 1227, which connects to a WDM 1229. The WDM 1229, which is coupled to the optical isolator 1231, combines the optical signals from the active fiber 1227 with the signal from a pump-multiplexer (P-MUX) 1233. P-MUX 1233 combines the outputs from a counter-propagating pump laser (at 1469 nm) 1235 and a counter-propagating pump laser (at 1486 nm) 1237.

FIG. 12b shows an EDFA that possesses a pre-amplifier 1201 and a MAL 1221 similar to the pre-amplifier and booster amplifier of FIG. 12a. However, booster amplifier 1251 utilizes bi-directional pump lasers 1253 and 1255. In this configuration, the booster amplifier 1251 architecture is identical to the pre-amplifier 1201. A WDM 1257 combines the signal from an optical isolator 1259 and the pump laser 1253. The WDM 1257 is connected to an active fiber 1261. A filter 1263 is situated between active fiber 1261 and another active fiber 1265, which is coupled to a WDM 1267. WDM 1267 connects to an optical isolator 1269 and the pump laser 1255.

Thus, the booster amplifier 1251 is made by either using the same structure of the pre-amplifier (FIG. 2b) or by pumping in a counter-propagating direction with two 1480 nm pump lasers (FIG. 2a). The performances of these amplifier structures are discussed below, in FIGS. 13a and 13b.

FIGS. 13a and 13b show graphs of the signal powers versus fiber length of the systems of FIGS. 12a and 12b, respectively. The corresponding signal power evolutions along the active fiber are shown in FIGS. 13a and 13b for the amplifier structures of FIGS. 12a and 12b, respectively. For the pre-amplifier and booster amplifier system of FIG. 12a, the total length is about 42 m; the active fiber 1227 within the booster amplifier 1223 is about 22 m, in which no filter is employed in the booster amplifier 1223. It should be noted that pumping the booster in counter-propagating direction (without filtering to invert the gain tilt and suppresses ASE lights) is more effective in reducing the FWM XT, but degrades the NF of the amplifier. Although in general the booster amplifier provides less impact on the NF than the pre-amplifier, in the example, the contribution of the booster is more significant because of the high middle access loss (14 dB).

As seen in FIG. 13b, the length of the pre-amplifier and booster amplifier system of FIG. 12b is also about 42 m. In both the amplifier structures of FIGS. 12a and 12b, significant reduction in length is made over the traditional L-band pre-amplifier and booster amplifier configuration (FIG. 14).

FIG. 14 shows a diagram of a traditional L-band pre-amplifier and booster amplifier system—without optimization for FWM XT reduction. An EDFA 1400 employs bi-directional pumping at 1480 nm in both pre-amplifier and booster amplifier without filters. A pre-amplifier 1401 includes an optical isolator 1403, which outputs to a WDM 1405. The WDM 1405 also receives an optical signal from a co-propagating pump laser 1407 at 1480 nm, and outputs to an Erbium doped active fiber 1409, which is connected to another optical isolator 1411. The optical isolator 1411 couples to another active fiber 1413. A WDM 1415 connects to a counter-propagating pump laser 1417 and an optical isolator 1419. A MAL 1421, which exhibits a 14 dB loss, is situated between pre-amplifier 1401 and a booster amplifier 1423.

Booster amplifier 1423 includes an optical isolator 1425 that couples to a WDM 1427. The WDM 1427 combines the optical signals from the optical isolator 1425 with the signal from a co-propagating pump laser (at 1480 nm) 1429. An Erbium doped fiber (i.e., active fiber) 1431 connects to another WDM 1433, which couples to a counter-propagating pump laser 1435 and an optical isolator 1437.

This structure 1400 has a length of about 60 m (as seen in FIG. 15), as compared to the amplifier structures of FIGS. 12a and 12b.

FIG. 15 shows a graph of signal powers versus fiber length for the non-optimized pre-amplifier and booster amplifier system of FIG. 14. The corresponding power evolution for some of the 32 WDM channels along the active fibers 1409, 1413, and 1431 is shown. At about 60 m, the power for the representative channels (i.e., 1579 nm, 1583 nm, 1587 nm, and 1591 nm) are equalized at above 5 dBm. The amplifier structure 1400 exhibits a slightly better NF than the structures of FIGS. 12a and 12b, but suffers from increased non-linear degradations. The noise figures for these structures are compared below in FIG. 16.

FIG. 16 shows a graph of the NF comparison for the various pre-amplifier and booster amplifier structures. Specifically, three EDFA configurations are compared. The first pre-amplifier and booster amplifier system is that of FIG. 14, in which bi-directional pumping at 1480 nm is used for both pre-amplifier and booster amplifier without filters. The second pre-amplifier and booster amplifier system resembles that of FIG. 12a, utilizing a co-propagant 1480 nm pump laser, a counter-propagant 1480 nm pump laser, a filter in the pre-amplifier, and two wavelength-multiplexed counter-propagating pump lasers at 1469 nm and 1486 nm in the booster amplifier without filtering. The third pre-amplifier and booster amplifier structure (corresponding to FIG. 12b) contains a pre-amplifier that has two 1480 nm pump lasers in bi-directional configuration with a filter between the active fibers and a booster amplifier that has the same structure with filtering. As seen in the figure, the first pre-amplifier and booster amplifier system (FIG. 14) exhibits the lowest NF across the band. The second pre-amplifier and booster amplifier system has the highest NF performance.

The above results reveal that the best compromise in terms NF and FWM XT is the amplifier structure of FIG. 12b, in which filters are used in both stages with bi-directional pumping. The structure of FIG. 12b with co-propagant pump laser at 980 nm provides the minimum NF.

However, depending on the middle access loss, the structure of FIG. 12a may be acceptable with respect to the NF performance, as shown in FIG. 17 (the structure shown in FIG. 12a yields the minimum FWM XT).

FIG. 17 shows a graph of the NF comparison with different MALs for the optimized pre-amplifier and booster amplifier system of FIG. 12a. In particular, the MALs of 14 dB and 10 dB are compared for the configuration of FIG. 12a. For example, a lower MAL may result from using high-end optical fibers, which do not necessitate substantial dispersion compensation. A reduction of 4 dB in the MAL results in a reduction in the noise figure by more than 1.2 dB.

Accordingly, the structure of FIG. 12a is viable, especially considering that the structure advantageously provides very low FWM XT.

FIGS. 18a and 18b show graphs of the measured output spectrum for the non-optimized pre-amplifier and booster amplifier system and the computed output spectrum for the optimized pre-amplifier and booster amplifier system, respectively. The FWM XTs that are generated within the three amplifier structures of FIGS. 12a, 12b, and 14 are measured. The measurements are conducted in the manner described with respect to FIG. 8. That is, the FWM XT is measured in nearly worst case conditions by using polarization maintaining laser sources and polarization maintaining MUX.

FIG. 18a shows the measured output spectrum from the complete amplifier without optimization with 3 dBm total input power and 20 dBm output power. The FWM XT is about −34.5 dB. The same measurement has been done with the optimized structure in both pre and booster amplifiers. FIG. 18b shows a maximum FWM XT of −45 dB. Table II shows a comparison of the maximum FWM XT under the middle channel and NF that is calculated for the three amplifier structures of FIGS. 12a, 12b, and 14.

It is noted that the output power from the amplifier is lower than the maximum power reached at the active fiber end because of the output loss.

FIG. 19 shows a diagram of an EDFA with All-Optical-Gain-Control (AOGC) mechanism used in a two-stage amplifier structure, in accordance with an embodiment of the present invention. The two stages of an EDFA 1900 with AOGC are a pre-amplifier 1902 and a booster amplifier 1904. Gain control techniques are important in WDM optical communication systems to avoid penalties due to non-linear effects. When only few channels are transmitted, the amplifiers must be controlled to avoid signal power increase along the system and associated penalties from the nonlinear effects within the transmission and active fibers.

According to an embodiment of the present invention, an automatic optical gain control is included in the optimized amplifier structures, as previously described, by introducing an optical feedback to clamp the gain of the amplifier to a proper value that is controlled by a variable optical attenuator 1907. For a given maximum number of channels and input power per channel, the AOGC mechanism of the EDFA 1900 ensures a nearly constant gain independently of the number of channels actually transmitted along the system (the typical maximum power variation is lower than 0.5 dB). In other words, whether the WDM system uses 2 channels or 32 channels, the output power per channel of the EDFA 1900 would be nearly constant.

In particular, an EDFA 1900 can ensure a suitable gain control and flatness for a limited total input power range, which depends on the maximum number of channels and input power per channel. The EDFA 1900 includes an optical isolator 1901 that is connected to a fiber Bragg grating (FBG) 1903. A three-port optical circulator 1905 receives the output of the FBG 1903 at one port; a second port of the circulator 1905 is connected to a variable attenuator (VA) 1907. The third port of the optical circulator 1905 is input to a WDM 1909 of pre-amplifier 1902. WDM 1909 also receives an input from a pump laser (980 nm/1480 nm) 1913, and outputs to an Erbium doped fiber (Er) (i.e., active fiber) 1915. A filter 1917 is disposed between the Er 1915 and another active fiber 1919. Another WDM 1921 couples to an end of the Er 1919; the WDM 1921 is connected to a three-port optical circulator 1923 and a pump laser 1925. The optical circulator 1923 is coupled to a FBG 1927 and an attenuator 1929. An optical isolator 1931 receives input from FBG 1927, and outputs to a MAL 1930, which, according to an exemplary embodiment, may include an OADM/GEF unit 1933 and a DCF 1935.

An optical isolator 1937 is situated between the DCF 1935 and a splitter (90/10) 1939. One input of the splitter 1939, namely the 10% input, receives signals from the variable attenuator 1929. The splitter 1939 outputs to a WDM 1941 of booster amplifier 1904. The WDM 1941 couples a pump laser 1943 (1480 nm) to the active fiber 1945. The WDM 1941 is connected to an Erbium doped fiber 1945, which in turn couples to a filter 1947. The filter 1947 is attached to another Erbium doped fiber 1949. A WDM 1951 outputs to an optical circulator 1953 and is also coupled to a pump laser 1955 (1480 nm). The optical circulator 1953 is connected to the VA 1907 and a FBG 1957. The FBGs 1903, 1927, and 1957, in an exemplary embodiment, is selected for 1576 nm. Signals from the FBG 1957 are fed to an optical isolator 1959. This arrangement advantageously minimizes FWM XT and NF, while maintaining independence from the number of input channels.

FIG. 20 shows a graph of the output spectra of 32 and 2 WDM channels systems with AOGC. The results of a 2 WDM channel system is shown in dashed lines, in which the

TABLE II

| | EDFA FIG. 12b | | | EDFA FIG. 12a | | | EDFA FIG. 14 | | |
|---|---|---|---|---|---|---|---|---|---|
| | PRE | | BOOSTER | PRE | | BOOSTER | PRE | | BOOSTER |
| Co: | 1480 nm | Co: | 1480 nm | Co: | 980 nm | Counter: 2 × 1480 nm | Co: | 1480 nm | Co: | 1480 nm |
| Counter: | 1480 nm | Counter: | 1480 nm | Counter: | 1480 nm | | Counter: | 1480 nm | Counter: | 1480 nm |
| | FILTER | | FILTER | FILTER | | NO FILTER | NO FILTER | | NO FILTER |
| Pin: | 3 dBm | Pin: | 4.5 dBm | Pin: | 3 dBm | Pin: 4.5 dBm | Pin: | 3 dBm | Pin: | 4.5 dBm |
| Pout: | 18.5 dBm | Pout: | 20 dBm | Pout: | 18.5 dBm | Pout: 20 dBm | Pout: | 18.5 dBm | Pout: | 20 dBm |
| | MAL: 14 dB | | | MAL: 14 dB | | | MAL: 14 dB | | |
| | NF: from 7.45 to 6.5 dB | | | NF: from 8.9 to 7.3 dB | | | NF: from 7 to 6.5 dB | | |
| | MAX FWM XT: −45 dB | | | MAX FWM XT: −47 dB | | | MAX FWM XT: −34.5 dB | | | power per channel is about 3 dBm. Similarly, with a 32 WDM channel system, the output power spectrum is about 3 dB. Therefore the AOGC, as discussed in FIG. 19, provides a nearly constant output power per channel, independently of the number of channels.

It is noted that the fiber Bragg gratings in the AOGC mechanism of FIG. 19 have been chosen at 1576 nm. In general, the feedback that provides the clamping mechanism can be introduced either at longer or shorter wavelength with respect to the VVDM signal. In those applications in which a booster amplifier is not required, the AOGC can be applied directly to a single stage amplifier, as shown in FIG. 21. That is, a single-stage amplifier with an AOGC can be used instead of a two stage amplifier structure (i.e., pre-amplifier and booster amplifier architecture), as more fully discussed with respect to FIGS. 21 and 22.

FIG. 21 shows a diagram of an EDFA with an Automatic Optical-Gain-Control (AOGC) mechanism used in a single stage amplifier structure, in accordance with an embodiment of the present invention. EDFA 2100 includes an optical isolator 2101 that is connected to a fiber Bragg grating (FBG) 2103. A three-port optical circulator 2105 receives the output of FBG 2103 at one port; a second port of the optical circulator 2105 is connected to a variable attenuator (VA) 2107. The third port of the optical circulator 2105 is input to a WDM 2109. WDM 2109 also receives an input from a pump laser (980 nm/1480 nm) 2111, and outputs to an Erbium doped fiber (Er) (i.e., active fiber) 2113. The Er 2113 is connected to another three-port optical circulator 2115. The optical circulator 2115 is coupled to a FBG 2117 and a variable attenuator 2119. An optical isolator 2121 receives input from the FBG 2117, and outputs to a filter 2123. The filter 2123 couples to an optical isolator 2125. A splitter (90/10) 2127 receives optical signals from the optical isolator 2125 and the variable attenuator 2119, and outputs to an Er 2129. A WDM 2131 is connected to the Erbium doped fiber 2129; the WDM 2131 is coupled to a pump laser 2133 (1480 nm) and an optical circulator 2135, which is connected to the VA 2107 and a FBG 2137. The FBG 2137 connects to an optical isolator 2139.

In the above arrangement, the choice of the fiber Bragg gratings 2103, 2117, and 2137 required to clamp the gain is less critical, because the lasing light is not transmitted through a filter, and consequently, can also be set at wavelengths lower than 1575 nm (as set in the system of FIG. 19). However, it should be noted that by centering the fiber Bragg gratings at wavelengths near the maximum gain of the L-band amplifier 2100 with inverting filter 2123 (e.g., 1560 nm –1565 nm), enhanced performance in term of precision of the gain control mechanism (e.g., very low power excursion in the surviving channels due to adding/dropping of channels) can be achieved.

Another possible structure for performing the AOGC in a single stage amplifier is shown in FIG. 22, according to one embodiment of the present invention. EDFA 2200 is architecturally similar to the EDFA 2100 of FIG. 21. EDFA 2200 has an optical isolator 2201 that is connected to a FBG 2203. A three-port optical circulator 2205 receives the output of FBG 2203 at one port; a second port of the optical circulator 2205 is connected to a VA 2207. The third port of the optical circulator 2205 is input to a WDM 2209. WDM 2209 also receives an input from a pump laser (980 nm/1480 nm) 2211, and outputs to an Er (i.e., active fiber) 2213. The Er 2213 is connected to an interferential (IF) filter 2223, which separates the laser light from the WDM signals. The laser light and ASE lights at wavelengths shorter than about 1575 nm are reflected by the IF filter 2223 and are transmitted an attenuator 2219, while the WDM signals pass through the IF filter 2215 to an inverting filter 2223. The spectral shape of the inverting filter 2223 is shown in FIG. 23. It should be noted that the IF filter 2215 also suppress the co-propagant ASE lights at wavelengths shorter than the signal bandwidth; the ASE lights are transmitted to the attenuator 2219 as the laser light.

The inverting filter 2223 is coupled to an optical isolator 2225, which is connected to a FBG 2217. The FBG 2217 couples to a circulator 2221. Circulator 2221 receives input from the FBG 2217 and outputs to an Er 2229. A WDM 2231 is connected to Er 2229; the WDM 2231 is also coupled to a pump laser 2233 (1480 nm) and an optical circulator 2235. The circulator 2235 connects to the VA 2207 and a FBG 2237. The FBG 2237 connects to an optical isolator 2239.

FIG. 23 shows the response of the inverting filter in the amplifier structure of FIG. 22. In particular, at about 1572 nm, the loss is about –13 dB. The loss increases from 1573 nm to a plateau of slightly more than –2 dB at 1593 nm. It is recognized that the spectral shape of the inverting filter 2223 (FIG. 22) can be tailored depending on the particular application.

The performances, in terms of AOGC and NF, of the two schemes shown in FIGS. 21 and 22 are very similar. It should be noted that with the FBG centered at 1565 nm, these amplifier structures 2100 and 2200 are able to improve the OSNR under different operating conditions—i.e., from fully-loaded to only a few input signal channels.

The above OSNR improvement can be seen in FIG. 24, which compares the NFs of the fully-loaded EDFA (32 WDM channels) with the condition of only two WDM input channels. This is achieved with a gain control mechanism which ensures signal power excursion lower than 0.5 dB.

FIG. 25 shows the experimental set-up used for power transient measurement. To better appreciate the present invention, the gain dynamics of the single stage L-band EDFA structures 2100 and 2200, shown in FIGS. 21 and 22, is considered; in particular, an understanding of the transient response of a surviving channel induced by adding/dropping of all other channels is needed. A test system 2500 utilizes 16 WDM input channels. A MUX 2501 multiplexes 15 of the 16 channels and outputs the composite signal to an acousto-optic modulator (AOM) 2503 to simulate adding/dropping of the 15 channels. The remaining channel, e.g., channel 9, is combined with the 15 channels after the AOM 2503 by means of a 50:50 coupler 2505. Next, the 16 channels are sent to the single stage L-band EDFA with AOGC 2200 (FIG. 22) that is being tested. The total input power of the amplifier 2200 is 3 dBm (–9 dBm per channel); and the total output power of a fully loaded amplifier 2200 is about 18 dBm. The FBGs (FIG. 2) of the EDFA 2200 are centered at 1565 nm. The output from the EDFA 2200 is sent to a tunable optical filter (TOF) 2507, which selects channel 9. The power transient of the selected channel 9 is analyzed by means of a high-speed digital scope 2509, which includes a photodiode (not shown). The modulation rate of the AOM 2503 is 250 Hz.

FIG. 26 shows the measured transient response of the surviving signal output power. The steady-state value of the surviving channel (channnel 9) has a maximum power excursion with and without the 15 WDM channels that is lower than 0.4 dB. This small error in the power control is due to inhomogeneity of the Erbium gain medium.

The transitions between these two power levels takes about 150 μs. By observing the dynamic behavior of the surviving channel that is induced by dropping/adding 15 out of 16 channels, it is noted that the spikes that are induced by the relaxation oscillations of the control laser do not overshoot the higher steady-state value (corresponding to only one channel present at the EDFA input) and only slightly undershoot (about 0.2 dB) the lower steady-state value (corresponding to filly loaded amplifier). The relaxation oscillation frequency is about 60 KHz. It is noted that the dynamic behavior of the amplifier 2200 is very attractive. In fact, by positioning the control laser near to the gain peak for L-band amplifier (spectral region from 1560 nm to 1565 nm), it is possible to find a good design compromise to reduce simultaneously, impairments due to relaxation oscillations and static error in the gain control due to inhomogeneity of the Erbium gain medium.

Fast power transients that are induced by adding/dropping of channels in WDM optical communication systems can cause serious system penalties. Notably, without an efficient AOGC mechanism, dropping of channels can induce penalties on the surviving channels stemming from relaxation oscillations overshooting the threshold for non-linear effects. Further, addition of channels can induced penalties related to lost of power on the surviving channels, which can lead to decreased power per channel that is below the receiver sensitivity.

The techniques described herein provide several advantages over prior approaches to design of an L-band EDFA. According to one embodiment of the present invention, the EDFA is shortened and optimized through the use of highly doped Erbium fibers and filters in the pre-amplifier and the booster amplifiers to invert the gain tilt and suppress the ASE lights at wavelengths shorter than the signal wavelengths. The EDFA has an AOGC mechanism to supply nearly constant output power per channel, independent of the number of channels used in the WDM communication system. The AOGC scheme also ensures reduced transient power excursion in surviving channels induced by adding/dropping of channels. This design minimizes FWM XT, while reducing the NF. This approach also reduces other nonlinear effects within the active fiber, such as cross-phase modulation.

Obviously, numerous modifications and variations of the present invention are possible in light of the above teachings. It is therefore to be understood that within the scope of the appended claims, the invention may be practiced otherwise than as specifically described herein.

What is claimed is:

1. A method of minimizing four-wave mixing cross-talk in a WDM (wavelength division multiplexing) optical communication system, the method comprising:
   injecting a co-propagant pump light into a first active fiber to induce high inversion in a portion of the first active fiber;
   filtering WDM signals from the first active fiber to invert tilt of the WDM signals; and
   injecting a counter-propagant light into a second active fiber to induce high inversion in a portion of the second active fiber.

2. The method according to claim 1, wherein the filtering step is performed, in part, to suppress ASE lights that are accumulated at wavelengths shorter than a signal bandwidth, and the injecting step is performed, in part, to equalize power of the WDM signals.

3. The method according to claim 1, wherein the first active fiber and the second active fiber in the respective injecting steps are alumnio-silicate Erbium doped.

4. The method according to claim 3, wherein each of the active fibers has an Erbium peak absorption of about 15.2 dB/m.

5. The method according to claim 4, wherein each of the active fibers further has an Al% (weight molar concentration) of about 2, a numerical aperture of about 0.27, a cut-off wavelength of about 970 nm, the active fibers exhibiting a loss of about 21 dB/km at about 1200 nm and an absorption of about 2.3 dB/m at about 1480 nm.

6. The method according to claim 4, wherein each of the active fibers has a core having Al% between about 1% and about 4%.

7. The method according to claim 4, wherein each of the active fibers has a numerical aperture (NA) between about 0.21 and about 0.29.

8. The method according to claim 1, wherein the step of injecting the co-propagant pump light is performed by at least one of a 980 nm pump laser and a 1480 nm pump laser.

9. The method according to claim 1, wherein the step of injecting the counter-propagant pump light is performed by a 1480 nm pump laser.

10. The method according to claim 1, wherein the WDM signals in the filtering step are within an L-band.

11. The method according to claim 1, further comprising:
    automatically controlling gain associated with the WDM signals via an optical feedback controlled by at least one variable optical attenuator.

12. An Erbium doped fiber amplifier (EDFA) apparatus operating in an L-band of a WDM communication system, comprising:
    a pre-amplifier configured to receive an input optical signal and to output an amplified input optical signal, the pre-amplifier comprising,
    a first active fiber configured to carry wave division multiplexing (WDM) signals,
    a co-propagating pump laser configured to induce high inversion in a portion of the first active fiber,
    a filter coupled to the first active fiber and configured to invert gain tilt of the WDM signals,
    a second active fiber coupled to the filter, and
    a counter-propagating pump laser configured to induce high inversion in a portion of the second active fiber;
    an optical unit coupled to the pre-amplifier and configured to receive the amplified input signal, the optical unit introducing a prescribed loss to the WDM system; and
    a booster amplifier coupled to the optical unit and configured to amplify a signal that is output from the optical unit.

13. The apparatus according to claim 12, wherein the filter suppresses ASE lights that are accumulated at wavelengths shorter than a signal bandwidth.

14. The apparatus according to claim 12, wherein the first active fiber and the second active fiber are alumnio-silicate Erbium doped.

15. The apparatus according to claim 14, wherein each of the active fibers has an Erbium peak absorption of about 15.2 dB/m.

16. The apparatus according to claim 14, wherein each of the active fibers further has an Al% (weight molar concentration) between about 1% and about 4%, a numerical aperture (NA) between about 0.21 and about 0.29, and a cut-off wavelength between about 950 nm and about 1200 nm.

17. The apparatus according to claim 12, wherein the co-propagant pump laser is at least one of a 980 nm pump laser and a 1480 nm pump laser, the counter-propagant pump laser being a 1480 nm pump laser.

18. The apparatus according to claim 12, wherein the pre-amplifier further comprises:
    a first wave division multiplexer coupled to the first active fiber and the co-propagating pump laser; and a second wave division multiplexer coupled to the second active fiber and the counter-propagating pump laser.

19. The apparatus according to claim 12, wherein the booster amplifier comprises:
   an active fiber configured to carry the output signal from the optical unit;
   a plurality of counter-propagating pump lasers configured to generate counter-propagant pump lights; and
   a pump-multiplexer coupled to the plurality of counter-propagant pump lasers and configured to multiplex the counter-propagant lights.

20. The apparatus according to claim 12, wherein one of the plurality of counter-propagant pump lasers of the booster amplifier is a 1469 nm pump laser, and another one of the plurality of counter-propagant pump lasers of the booster amplifier is a 1486 nm pump laser.

21. The apparatus according to claim 12, wherein the booster amplifier comprises:
   a first active fiber configured to carry WDM signals;
   a co-propagating pump laser configured to induce high inversion in a portion of the first active fiber;
   a filter coupled to the first active fiber and configured to invert gain tilt of the WDM signals;
   a second active fiber coupled to the filter; and
   a counter-propagating pump laser configured to induce high inversion in a portion of the second active fiber.

22. The apparatus according to claim 21, wherein the first active fiber and the second active fiber of the booster amplifier are alumnio-silicate Erbium doped.

23. The apparatus according to claim 22, wherein each of the active fibers of the booster amplifier has an Erbium peak absorption of about 15.2 dB/m.

24. The apparatus according to claim 23, wherein each of the active fibers of the booster amplifier further has an Al% (weight molar concentration) between about 1% and about 4%, and a numerical aperture between about 0.21 and about 0.39.

25. The apparatus according to claim 21, wherein the co-propagant pump laser of the booster amplifier and the counter-propagant pump laser of the booster amplifier are 1480 nm pump lasers.

26. The apparatus according to claim 12, wherein the optical unit is at least one of an optical add/drop module, a gain equalizing filter (GEF), or a dispersion compensating fiber (DCF).

27. The apparatus according to claim 12, further comprising:
   a variable optical attenuator configured to provide a feedback loop between an output of the booster amplifier and an input of the pre-amplifier to automatically maintain constant output power of the apparatus.

28. An optical amplifier device for minimizing four-wave mixing cross-talk, comprising:
   a first active fiber configured to carry wave division multiplexing (WDM) signals corresponding to an operating band;
   a co-propagating pump laser configured to induce high inversion in a portion of the first active fiber;
   a filter coupled to the first active fiber and configured to invert gain tilt of the WDM signals;
   a second active fiber coupled to the filter; and
   a counter-propagating pump laser configured to induce high inversion in a portion of the second active fiber.

29. The device according to claim 28, wherein the first active fiber and the second active fiber are alumnio-silicate Erbium doped.

30. The device according to claim 29, wherein each of the active fibers has an Erbium peak absorption of about 15.2 dB/m.

31. The device according to claim 30, wherein each of the active fibers further has an Al% (weight molar concentration) between about 1% and about 4%, and a numerical aperture between about 0.21 and about 0.29.

32. The device according to claim 28, wherein the co-propagant pump laser is at least one of a 980 nm pump laser and a 1480 nm pump laser, the counter-propagant pump laser being a 1480 nm pump laser.

33. The device according to claim 28, wherein the operating band is L-band.

34. The device according to claim 28, further comprising:
   a first wave division multiplexer coupled to the first active fiber and the co-propagating pump laser; and
   a second wave division multiplexer coupled to the second active fiber and the counter-propagating pump laser.

35. The device according to claim 28, further comprising:
   a first optical circulator coupled to the first wave division multiplexer;
   a variable optical attenuator coupled to the first optical circulator and configured to provide automatic gain control of a gain of the optical amplifier device; and
   a second optical circulator coupled to the variable attenuator and to the second wave division multiplexer.

36. An Erbium doped fiber amplifier (EDFA) apparatus operating in an L-band of a WDM communication system, comprising:
   a pre-amplifying means for receiving an input optical signal and for outputting an amplified input optical signal, the pre-amplifying means comprising,
      a first active fiber configured to carry wave division multiplexing (WDM) signals,
      a co-propagating pumping means for inducing high inversion in a portion of the first active fiber,
      a filtering means coupled to the first active fiber for inverting tilt of the WDM signals,
      a second active fiber coupled to the filtering means, and
      a counter-propagating pumping means for inducing high inversion in a portion of the second active fiber;
   means coupled to the pre-amplifying means for receiving the amplified input signal and for introducing a prescribed loss to the WDM system; and
   an amplifying means for amplifying a signal that is output from the means for introducing the prescribed loss.

37. The apparatus according to claim 36, wherein the filtering means suppresses ASE lights that are accumulated at wavelengths shorter than a signal bandwidth.

38. The apparatus according to claim 36, wherein the first active fiber and the second active fiber are alumnio-silicate Erbium doped.

39. The apparatus according to claim 38, wherein each of the active fibers has an Erbium peak absorption between about 13 dB/m and about 20 dB/m.

40. The apparatus according to claim 38, wherein each of the active fibers further has an Al% (weight molar concentration) between about 1% and about 4% and a numerical aperture (NA) between about 0.21 and about 0.29.

41. The apparatus according to claim 36, wherein the co-propagant pumping means is at least one of a 980 nm pump laser and a 1480 nm pump laser, the counter-propagant pumping means being a 1480 nm pump laser.

42. The apparatus according to claim 36, wherein the pre-amplifying means further comprises:
   a first wave division multiplexing means coupled to the first active fiber and the co-propagating pumping means; and a second wave division multiplexing means coupled to the second active fiber and the counter-propagating pumping means.

43. The apparatus according to claim 36, wherein the amplifying means comprises:

an active fiber configured to carry the output signal from the optical unit;

a plurality of counter-propagating pumping means for generating counter-propagant pump lights; and a pump-multiplexing means coupled to the plurality of counter-propagant pumping means for multiplexing the counter-propagant lights.

44. The apparatus according to claim 36, wherein one of the plurality of counter-propagant pumping means of the amplifying means is a 1469 nm pump laser, and another one of the plurality of counter-propagant pumping means of the amplifying means is a 1486 nm pump laser.

45. The apparatus according to claim 36, wherein the amplifying means comprises:

a first active fiber configured to carry WDM signals;

a co-propagating pumping means for inducing high inversion in a portion of the first active fiber;

a filtering means coupled to the first active fiber for inverting gain tilt of the WDM signals;

a second active fiber coupled to the filtering means; and a counter-propagating pumping means for inducing high inversion in a portion of the second active fiber.

46. The apparatus according to claim 45, wherein the first active fiber and the second active fiber of the booster amplifier are alumnio-silicate Erbium doped.

47. The apparatus according to claim 46, wherein each of the active fibers of the amplifying means has an Erbium peak absorption between about 13 dB/m and about 20 dB/m.

48. The apparatus according to claim 47, wherein each of the active fibers of the amplifying means further has an Al% (weight molar concentration) between about 1% and about 4%, and a numerical aperture between about 0.21 and about 0.29.

49. The apparatus according to claim 45, wherein the co-propagant pumping means of the amplifying means and the counter-propagant pumping means of the amplifying means are 1480 nm pump lasers.

50. The apparatus according to claim 36, wherein the means for introducing the prescribed loss is at least one of an optical add/drop module, a gain equalizing filter (GEF), or a dispersion compensating fiber (DCF).

51. The apparatus according to claim 36, further comprising:

an attenuating means for providing a feedback loop between an output of the amplifying means and an input of the pre-amplifying means to automatically maintain constant output power per channel of the apparatus.

* * * * *